(12) United States Patent
Nakagome et al.

(10) Patent No.: US 9,523,810 B2
(45) Date of Patent: Dec. 20, 2016

(54) ILLUMINATION DEVICE AND DISPLAY DEVICE

(71) Applicant: TOPPAN PRINTING CO., LTD., Tokyo (JP)

(72) Inventors: Tomohiro Nakagome, Kuki (JP); Kazuki Kimura, Moriya (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 223 days.

(21) Appl. No.: 14/228,519

(22) Filed: Mar. 28, 2014

(65) Prior Publication Data
US 2014/0211506 A1 Jul. 31, 2014

Related U.S. Application Data

(63) Continuation of application No. PCT/JP2012/075139, filed on Sep. 28, 2012.

(30) Foreign Application Priority Data

Sep. 29, 2011 (JP) ................................ 2011-214313

(51) Int. Cl.
*F21V 7/04* (2006.01)
*F21V 8/00* (2006.01)

(52) U.S. Cl.
CPC ........... *G02B 6/0033* (2013.01); *G02B 6/0036* (2013.01); *G02B 6/0061* (2013.01); *G02B 6/0053* (2013.01)

(58) Field of Classification Search
CPC ... G02B 6/0033; G02B 6/0035; G02B 6/0036; G02B 6/0053; G02B 6/0055; G02B 6/0061; G02B 6/0015; G02B 6/0016; G02B 6/0043; G02B 6/0058
See application file for complete search history.

(56) References Cited

U.S. PATENT DOCUMENTS

2011/0228556 A1* 9/2011 Wang et al. ......... G02B 6/0036
 362/606
2012/0134177 A1* 5/2012 Kim et al. ........... G02B 6/0061
 362/607

FOREIGN PATENT DOCUMENTS

JP 01-241590 9/1989
JP 03-006525 1/1991
(Continued)

OTHER PUBLICATIONS

Taiwanese Office Action dated Mar. 6, 2015 in corresponding Taiwanese Patent Application No. 101135719.
(Continued)

*Primary Examiner* — Y M Lee

(57) ABSTRACT

In an illumination device of the invention, as an arrangement interval of light deflection elements in a first direction discontinuously varies, an arrangement interval in a first direction becomes small with increased distance from an incidence face, where one of regions adjacent to each other which is close to the incidence face is referred to as a first region, the other of the regions which is away from the incidence face is referred to as a second region, as the arrangement interval of the light deflection elements in a second direction discontinuously varies at a boundary between the first region and the second region, the arrangement interval of part of the first region which is closest to the incidence face is smaller than the arrangement interval of part of the second region which is closest to the boundary.

8 Claims, 20 Drawing Sheets

(56) References Cited

FOREIGN PATENT DOCUMENTS

| | | |
|---|---|---|
| JP | 09-166712 | 6/1997 |
| JP | 10-227918 | 8/1998 |
| JP | 2000-089033 | 3/2000 |
| JP | 2003-043266 | 2/2003 |
| JP | 2010-061128 | 3/2010 |
| TW | 201015132 | 4/2010 |

OTHER PUBLICATIONS

International Search Report mailed Dec. 25, 2012 in corresponding International Application No. PCT/JP2012/075139.

* cited by examiner

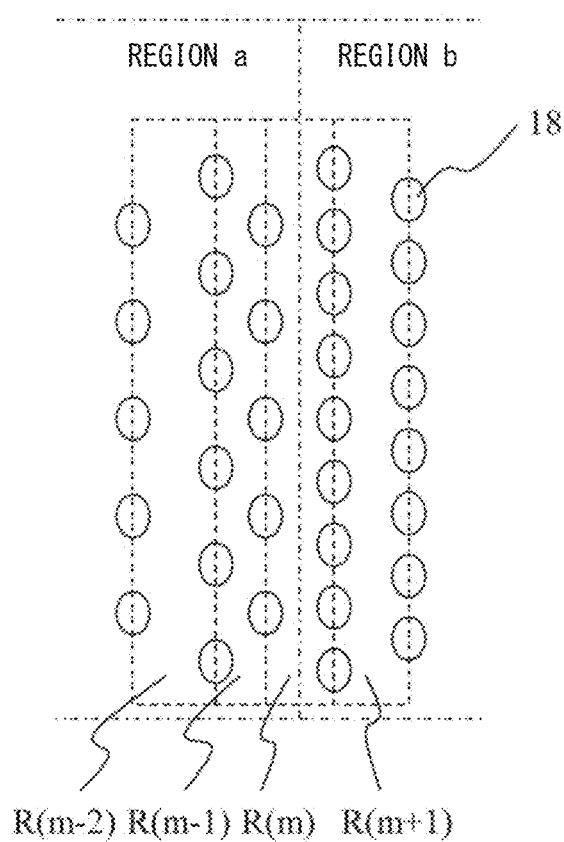

DISTANCE FROM INCIDENT FACE SIDE 7L

FIG. 22

| | RATE OF LUMINANCE AT SCREEN CENTER | Min/Max | INTEGRATED LUMINANCE |
|---|---|---|---|
| EXAMPLE 1 | 115% | 77% | 110% |
| COMPARATIVE EXAMPLE 1 | 100% | 78% | 100% |

FIG. 23

| | RATE OF LUMINANCE AT SCREEN CENTER | Min/Max | INTEGRATED LUMINANCE |
|---|---|---|---|
| EXAMPLE 2 | 110% | 81% | 105% |
| COMPARATIVE EXAMPLE 2 | 100% | 80% | 100% |

ILLUMINATION DEVICE AND DISPLAY DEVICE

CROSS REFERENCE TO RELATED APPLICATIONS

This application is a continuation application based on a PCT Patent Application No. PCT/JP2012/075139, filed Sep. 28, 2012, whose priority is claimed on Japanese Patent Application No. 2011-214313 filed on Sep. 29, 2011, the contents of which are hereby incorporated by reference in their entirety.

BACKGROUND OF THE INVENTION

Field of the Invention

The present invention relates to an illumination device that is mainly used to control an illumination light path, and a display device.

Particularly, the present invention relates to an illumination device which realizes a simple manufacturing process as compared with a conventional process and uses an edge lighting system including a light guide body that realize a high degree of efficiency and a high degree of luminance, and a display device that is provided with the illumination device.

Description of the Related Art

A direct type illumination device and an illumination device using an edge lighting system are mainly adopted as a flat panel display or the like as typified by a recent liquid crystal television.

In the direct type illumination device, a plurality of cold-cathode tubes or LEDs (Light-Emitting Diodes), which serve as a light source, is regularly arranged on a back face of the panel.

A diffusion plate having a high degree of light scattering is used between an image display device such as a liquid crystal panel and the light source, and a configuration is adopted which causes cold-cathode tubes or LEDs which serve as a light source not to be visually recognized.

On the other hand, in the illumination device using an edge lighting system, cold-cathode tubes or LEDs are arranged at an end face (entry face) of a light-transmissive plate which is referred to as a light guide plate.

Generally, a light deflection element that effectively guides light entering the end face of the light guide plate to the emission face thereof is formed at a face (light deflection face) that is located on the opposite side of an emission face (face facing the image display device) of the light guide plate.

Currently, as a configuration of the light deflection element which is formed on the light deflection face, a configuration in which a white ink is printed thereon in a linear manner or in a scattered manner is generally known (for example, Patent Japanese Unexamined Patent Application, First Publication No. H1-241590 and Japanese Unexamined Patent Application, First Publication No. H3-6525).

In the light guide plate, since a light source is arranged at the end face of the transparent plate, an amount of light introduced into the region which is close to the light source is large, and an amount of light introduced into the region apart from the light source is relatively small.

Because of this, by arranging the light deflection elements so that the density of the light deflection elements (the number of the light deflection elements per unit area) is low at the position close to the light source and so that the density thereof is high at the position apart from the light source, a light guide is designed to uniformly emit light from the emission face.

Japanese Unexamined Patent Application, First Publication No. H3-6525 discloses a method of sparsely and densely arranging light deflection elements (a method of arranging the light deflection elements by adjusting an amount, a size, a position, a shape, or a density of the light deflection elements) and describes: a method of arranging the light deflection elements at a constant pitch while varying the sizes thereof; or a method of gradually varying arrangement intervals between the light deflection elements without varying the sizes thereof.

Most of light guide plates which are formed by a current printing method are produced using a method of arranging the light deflection elements at a constant pitch while varying the sizes thereof.

However, since light that is incident to a white dot is substantially uncontrollably and diffusely reflected, the emission efficiency thereof is low.

Additionally, it is not possible to exclude consideration of the light absorption due to the white ink.

Consequently, a method of forming micro lenses on a light deflection face of a light guide plate using an inkjet method, a method of forming light deflection elements using a laser ablation method, or the like, has been proposed in recent years.

Different from the case of using a white ink, since reflection, refraction, and transmission which are due to a refractive index difference between the resin of a light guide plate and air are used, light absorption hardly occurs.

For this reason, a light guide plate with a high level of light emission efficiency can be obtained as compared with a white ink.

However, similar to the printing of a white ink, since such light deflection elements which are formed using an inkjet method or a laser ablation method are formed in a different step after a light guide plate is shaped to be a flat plate, it does not mean that the number of processes is reduced.

Instead, the takt time of the step of using an inkjet method or a laser ablation method is longer than that of a step of printing a white ink, furthermore, there is a problem of an increase in cost such that the initial cost of equipment is high.

Consequently, a method has been proposed which shapes a light guide plate using an injection molding method or an extrusion molding method, and directly shapes light deflection elements during injection molding or extrusion molding (for example, Japanese Unexamined Patent Application, First Publication No. 2000-89033).

Since the light deflection elements are formed simultaneously with the shaping of the light guide plate, the number of processes is reduced, and cost reduction can be achieved.

However, when the light deflection elements are arranged while partially varying the density of the light deflection elements, it is difficult to gradually vary the sizes of the light deflection elements such as the case of the light guide plate using the aforementioned printing method.

Accordingly, a method is often adopted which partially adjusts (sparsely or densely adjusts) the density of the light deflection elements by gradually varying the arrangement intervals of the light deflection elements without varying the sizes thereof.

However, in the method of gradually varying the arrangement intervals of the light deflection elements, the arrangement intervals in two directions in a plane of the light deflection face are required to vary, and a layout design and manufacture of a die with reference to the layout design are extremely complicated.

In the case of adopting a method of fixing an arrangement interval in one direction (direction parallel to an incidence face of the light guide plate: X-direction) of the two directions and of only varying arrangement intervals in the other direction (direction orthogonal to the incidence face of the light guide plate: Y-direction) in order to facilitate the layout design, the following problem occurs.

Particularly, in a case where an interval in the X-direction is determined with reference to a low-density region adjacent to a light source (region having a low density of the light deflection elements), since the interval in the X-direction increases, it is not possible to sufficiently increase the density thereof in a high-density region apart from the light source, and an amount of light emitted from the emission face of the light guide plate decreases.

In contrast, in a case where an interval in the X-direction is determined with reference to a high-density region apart from the light source (region having a high density of the light deflection elements), since the interval in the X-direction decreases, an interval in the Y-direction is required to increase in the low-density region adjacent to the light source.

In this case, the light deflection elements are visually recognized in the low-density region, such as being aligned on a straight line parallel to the X-direction.

Japanese Unexamined Patent Application, First Publication No. 2003-43266 discloses a method of forming light deflection elements as a result of forming band-shaped regions on which dots (light deflection elements) are arranged at a constant pitch in both the X-direction and the Y-direction so that a band-shaped region having a high density of the light deflection elements is arranged at a position apart from a light source.

However, in the case of adopting such an arrangement, since the light deflection elements are arranged at a constant interval in the band-shaped region, a difference in amount of emission light between the portion close to the light source and the portion apart therefrom in the band-shaped region occurs, and a boundary between such band-shaped regions is visually recognized.

In order to solve this problem, it is necessary to reduce widths of the band-shaped regions in the Y-direction as much as possible so that it is not visible to the human eye; as a result, the number of band-shaped regions voluminously increases, and it does not contribute to simplification of a layout design and manufacture of a die with reference to the layout design.

Furthermore, even in the case where the light deflection elements are arranged as a result of partially adjusting (sparsely or densely adjusting) the density of the light deflection elements so as to make the configuration of the light deflection elements in the X-direction fixed and so as to vary the arrangement intervals in the Y-direction, there is another problem too.

FIGS. 14A and 14B illustrate an in-plane luminance distribution in the case where one light source or a plurality of light sources are arranged on two side end faces which are located opposite to each other and form a light guide plate, light deflection elements are arranged in a fixed manner in the X-direction, and light deflection elements are patterned (sparse-and-dense patterning) by partially adjusting (sparsely or densely adjusting) the density of the light deflection elements only in the Y-direction.

Light that is incident through an end face radially spreads to the inside of a light guide plate, and due to the influence of overlapping of the light sources, the influence of light reflection or light leakage from the end face on which the light source is not disposed, or the like, triangular regions G having a low luminance occur at the right and left in the in-plane thereof.

Generation of the above-mentioned dark region D is undesirable for surface illumination.

Accordingly, in a conventional light guide plate, since it is difficult to arrange the light deflection elements in the X-direction at a constant pitch, a design such that the number of light deflection elements increases in a locally-generated dark region is necessary, and a layout design of the light deflection elements become complicated.

SUMMARY OF THE INVENTION

The invention was made in order to solve the above conventional problems, and has an object to provide an illumination device including a light guide body that can be produced more easily than in a conventional manner and has a high level of uniformity in luminance and a high level of emission efficiency, and a display device using the illumination device.

The invention takes measures described below in order to solve the aforementioned problems.

An illumination device of a first aspect of the invention includes: a transmissive light guide body having a first main surface, a second main surface that is located on the opposite side of the first main surface, and four side end faces that connect the first main surface to the second main surface, at least one of the four side end faces being an incidence face; a plurality of light sources that are provided in a first direction, in which the incidence face extends, so as to face the incidence face; a plurality of light deflection elements that are independently provided on the first main surface, deflects light, which is incident to the incidence face and is introduced into the inside of the light guide body, to be directed to the second main surface, the light deflection elements being in a concave or convex scattered arrangement; and an optical path control element that is provided on the second main surface, extends in a second direction substantially orthogonal to the first direction, and regulates an optical path of the light that is introduced into the inside of the light guide body.

The density D of the light deflection elements, which represents the number of the light deflection elements being present per unit area, that increases with an increase in a distance in the second direction from the incidence face to the position at which the light deflection elements are arranged; an arrangement pattern of the light deflection elements is separated into a plurality of regions in the second direction; in one region, an arrangement interval of the light deflection elements in the first direction is substantially constant, an arrangement interval of the light deflection elements in the second direction varies to be small with increased distance from the incidence face, in between the regions, as the arrangement interval of the light deflection elements in the first direction discontinuously varies, the arrangement interval in the first direction becomes small with increased distance of the region from the incidence face.

Where the region which is close to the incidence face is referred to as a first region, the region which is away from the incidence face is referred to as a second region, as the arrangement interval of the light deflection elements in the second direction discontinuously varies at the boundary between the first region and the second region, the arrangement interval of part of the first region which is closest to the boundary is smaller than the arrangement interval of part of the second region which is closest to the boundary.

According to the illumination device of the first aspect of the invention, since the light deflection elements formed on the first main surface of the light guide body are arranged so that the density D of the light deflection elements increases with an increase in the distance from the incidence face to the position at which the light deflection elements are arranged, an illumination device having the face that entirely and uniformly emits light can be obtained.

Furthermore, since the optical path control element extending in the Y-direction (second direction) is formed on the second main surface, an illumination device which prevents bright and dark portions from locally occurring and has the face that entirely and uniformly emits light can be obtained.

Moreover, the arrangement pattern of the light deflection elements is separated into the regions in the Y-direction, the arrangement interval in the X-direction is constant in each region, the arrangement interval in the Y-direction is defined so as to have a sparse-and-dense pattern in which the density of the light deflection elements is adjusted, therefore, it is also possible to produce luminescence in each region.

Furthermore, the configuration of the light deflection elements in between the regions is configured such that the arrangement interval in the X-direction in the region apart from the light source is smaller than the arrangement interval in the X-direction in the region close to the light source.

Additionally, the arrangement interval in the Y-direction in the region close to the light source is configured to be smaller than the arrangement interval in the Y-direction in the region apart from the light source.

For this reason, it is possible to simply produce placement that improves the rate of emission light from the light guide body while preventing the light deflection element from being visually recognized.

In the illumination device of the first aspect of the invention, regarding the density D of the light deflection elements which represents the number of the light deflection elements being present per unit area, it is preferable that a function of reciprocal number $1/D(y)$ of a density function $D(y)$ based on a distance y from the incidence face to a position at which the light deflection elements are provided be represented by mainly summing two functions of a first function $F(y)$ and a second function $S(y)$; it is preferable that the first function $F(y)$ monotonically decrease with respect to the distance y; and it is preferable that, while the second function $S(y)$ repeatedly decreases and increases several times with respect to the distance y, an absolute value of a maximum amplitude value of each cycle thereof monotonically decrease.

That is, the illumination device of the first aspect of the invention includes: a transmissive light guide body having a first main surface, a second main surface that is located on the opposite side of the first main surface, and four side end faces that connect the first main surface to the second main surface, at least one of the four side end faces being an incidence face; a plurality of light sources that are provided in a first direction, in which the incidence face extends, so as to face the incidence face; a plurality of light deflection elements that are independently provided on the first main surface, deflects light, which is incident to the incidence face and is introduced into the inside of the light guide body, to be directed to the second main surface, the light deflection elements being in a concave or convex scattered arrangement; and an optical path control element that is provided on the second main surface, extends in a second direction substantially orthogonal to the first direction, and regulates an optical path of the light that is introduced into the inside of the light guide body.

Regarding the density D of the light deflection elements which represents the number of the light deflection elements being present per unit area, since the function of inverse number $1/D(y)$ of the density function $D(y)$ with reference to the distance y from the incidence face to the position at which the light deflection elements are provided is represented by mainly summing two functions of the first function $F(y)$ and the second function $S(y)$, the first function $F(y)$ monotonically decreases with respect to the distance y, while the second function $S(y)$ repeatedly decreases and increases several times with respect to the distance y, the absolute value of the maximum amplitude of each period thereof monotonically decreases.

According to the illumination device of the first aspect of the invention, since the optical path control element extending in the Y-direction is formed on the second main surface, an illumination device which prevents bright and dark portions from locally occurring and has the face that entirely and uniformly emits light can be obtained.

In addition, since the function of reciprocal number $1/D(y)$ of the density function $D(y)$ of the light deflection elements arranged on the first main surface is represented by the sum of the first function $F(y)$ that monotonically decreases with respect to the distance y from the incidence face to the position at which the light deflection elements are arranged and the second function $S(y)$ that repeatedly decreases and increases, the absolute value of the maximum amplitude of each period thereof monotonically decreases.

For this reason, an illumination device with locally high luminance while maintaining uniformity in luminance of the entire face can be obtained.

In the illumination device of the first aspect of the invention, it is preferable that the maximum value of the distance y be represented as Ymax; and it is preferable that variation in differential value $dF(y)/dy$ of the first function $F(y)$ be less than or equal to twice the average value of the differential value $dF(y)/dy$ in a range of $0<y/Ymax<0.9$.

Because of this, it is possible to maintain uniformity in luminance of the entire face to be in a desired range.

In the illumination device of the first aspect of the invention, it is preferable that a distance from the incidence face to a side end face that is located opposite to the incidence face be represented as L, and a decrease-and-increase repetition period of the second function $S(y)$ be in a range of $0.7 \times L/2.5$ to $1.2 \times L/2.5$.

As a consequence, it is possible to set the peak position of luminance to be the center of the surface while maintaining uniformity in luminance of the entire face.

In the illumination device of the first aspect of the invention, it is preferable that, where a position at which the differential value $dS(y)/dy$ of the second function $S(y)$ becomes 0 is represented as $y\lambda i$ (i=1, 2, . . . n), $0.01 \times F(y\lambda i)<|S(y\lambda i)|<0.1 \times F(y\lambda i)$ be satisfied.

Because of this, it is possible to reduce variation in luminance of the regions having locally high luminance as well as uniformity in luminance of the entire face.

In the illumination device of the first aspect of the invention, it is preferable that, where: a maximum angle formed between the first main surface and a tangential line of a cross-sectional shape, which is obtained by cutting the light deflection element by a face that is perpendicular to the first main surface and parallel to the first direction, is represented as θd; a maximum angle formed between the first main surface and a tangential line of a cross-sectional shape by cutting the optical path control element by a face that is perpendicular to the first main surface and parallel to the first direction is represented as θL; and a refractive index of the light guide body is represented as n, the maximum angle θL of the optical path control element satisfy the range defined by the following Formula (1).

(Equation 1)

$$\sin^{-1}\left(\frac{1}{n}\right) - \theta d \leq \theta L \leq \frac{\pi}{2} - 2\theta d + \sin^{-1}\left(\frac{1}{n}\right) \quad \text{Formula (1)}$$

According to the illumination device of the first aspect of the invention, as a result of determining the maximum tangent angle θL in the cross-sectional configuration of the optical path control element formed on the second main surface of the light guide body to be in the range indicated by Formula (1), the light path inside the light guide body is controlled, uniformity in luminance of the entire face is thereby improved, and the illumination device that causes light to effectively rise up to be directed to the front direction of the surface thereof can be obtained.

It is preferable that the illumination device of the first aspect of the invention include a reflective sheet that is provided at a position facing the first main surface of the light guide body.

The reason is that, light leaking from the first main surface of the light guide body toward external side thereof is made re-incident to the light guide body, and light utilization efficiency increases.

It is preferable that the illumination device of the first aspect of the invention include at least one or more transmissive optical sheets that are provided at a position facing the second main surface of the light guide body.

In the illumination device of the first aspect of the invention, control of emitted light is carried out by the light deflection elements and the optical path control element which form the light guide body; furthermore, in order to obtain a desired luminance or diffusivity, a transmissive optical sheet may be provided therein.

In the case of desirably increasing luminance by light collection, a light-condensing sheet as typified by, for example, a prism sheet may be disposed.

Alternatively, in the case of desirably widening a viewing field by diffusing emission light emitted from the light guide body, a diffusion sheet or a diffuser plate may be disposed.

A display device of a second aspect of the invention includes: a plurality of pixels; an image display device that determines a display image in accordance with light transmission or light shielding for each of the pixels; and the above-described illumination device.

The illumination device of the first aspect has a high level of in-plane uniformity in luminance, can locally increase luminance in a desired area, and thereby preferably serves as a backlight unit of a display device.

Particularly, as such a display device, a display device that defines a display image for each pixel in accordance with light transmission or light shielding is preferable.

Effects of the Invention

According to the aspects of the invention, the optical path control element that controls the light guiding inside the light guide body is provided on the second main surface of the light guide body, and the light deflection elements that efficiently allow the guided light to be guided into the second main surface are provided on the first main surface.

Furthermore, the light deflection elements are separated into the regions.

The light deflection elements are arranged so that the density of the light deflection elements in the X-direction of the regions is constant and so that the density of the light deflection elements in the Y-direction of the regions is partially low or high (sparse-and-dense configuration).

According to the foregoing configuration, it is possible to provide an illumination device including a light guide body that can be produced more easily than in a conventional manner and has a high level of uniformity in luminance and a high level of emission efficiency, and it is possible to provide a display device using the illumination device.

BRIEF DESCRIPTION OF THE DRAWINGS

FIG. 4 is a diagram illustrating an area required to calculate the density of the light deflection elements.

FIG. 22 is a table illustrating an experimental result of Example of the invention and an experimental result of Comparative Example.

FIG. 23 is a table illustrating an experimental result of Example of the invention and an experimental result of Comparative Example.

DETAILED DESCRIPTION OF THE INVENTION

First Embodiment

Hereinafter, the embodiment of the invention will be particularly described with reference to drawings.

Figure 1:
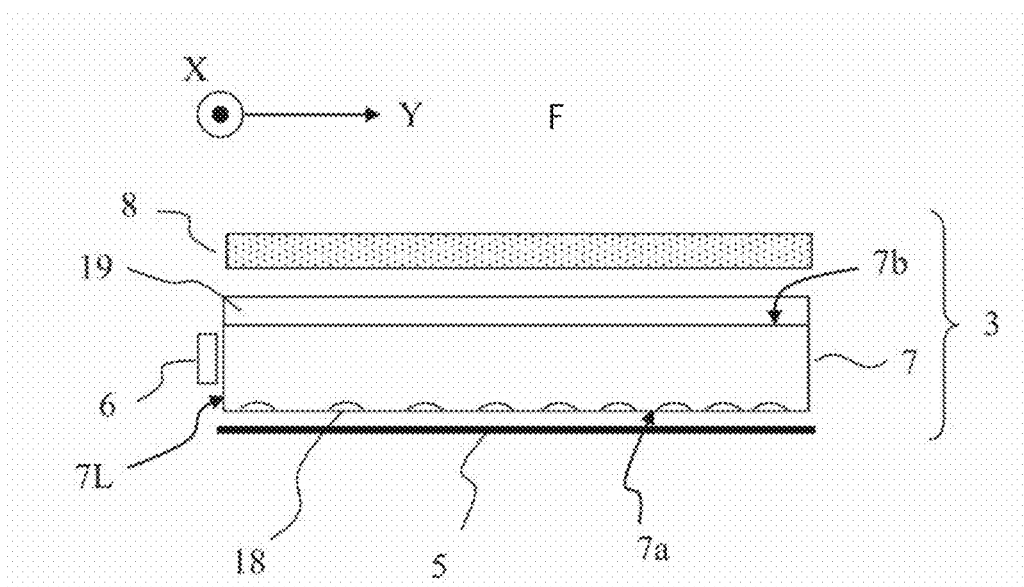
FIG. 1 is a schematic cross-sectional view showing an illumination device of an embodiment of the invention.

FIG. 1 is a schematic cross-sectional view showing an illumination device 3 of the embodiment of the invention.

In the drawings which are utilized in the following explanation, appropriate changes have been made to the scale of the various members, in order to represent them at scales at which they can be easily understood.

The illumination device 3 is configured to include at least a light guide body 7 and a light source 6.

In addition, a reflector (reflective sheet) 5 and at least one or more transmissive optical sheets 8 may be included.

As the light source 6, for example, point light sources 6 are adopted.

As such point light sources 6, an LED (light-emitting diode) is adopted; and as such an LED, a white LED, an RGB-LED that is constituted of chips emitting light of three primary colors, which are red, green, and blue, or the like is adopted.

A plurality of such point light sources 6 are arranged in the extending direction (X-direction, first direction) on at least one end face 7L (incidence face) of four side end faces of the light guide body 7.

As an example, FIG. 1 shows that the light sources 6 are arranged on one entry face 7L of the light guide body 7; however, the invention is not limited to this constitution, and a structure may be adopted in which the light sources are arranged on two end faces, which are located opposite to each other, of the end faces forming the light guide body.

Alternatively, the light source 6 may be a fluorescent tube, as typified by a CCFL (cold-cathode tube), or a surface light source.

Moreover, a shape of the light guide body 7 may be not only a flat-plate shape shown in FIG. 1 but also a wedge shape or the like.

The light guide body 7 has a light deflection face 7a (first main surface) and an emission face 7b (second main surface).

The emission face 7b is provided at a viewer side F of the light guide body 7 (position close to an observer), and the light deflection face 7a is formed at a face on the opposite side of the emission face 7b.

The light deflection face 7a is formed of a flat surface and light deflection elements 18.

The light deflection element 18 deflects light introduced into the inside of the light guide body 7 such that the angle thereof is converted into an angle at which the light is emitted from the emission face 7b.

As the light deflection elements 18, scattered structures are adopted which are discretely arranged on a flat surface, such as having a concave or convex micro lens shape or a three-dimensional triangle shape.

Moreover, irregularity 17 (not shown in the figure) that is sufficiently finer than the light deflection element 18 may be applied to the above-mentioned flat surface.

It is desirable that a height of the microscopic irregularity 17 (distance from the light deflection face 7a to the apex of the irregularity 17) be less than or equal to 1/10 of the height of the light deflection element 18 (distance from the light deflection face 7a to the apex of the light deflection element 18).

If the height of the irregularity 17 exceeds 1/10 of the height of the light deflection element 18, it significantly affects uniformity in surface luminance of the light guide body 7 and is undesirable.

It is preferable that the microscopic irregularities 17 be discretely arranged on the flat surface of the light deflection face 7a in a scattered arrangement.

A configuration of the microscopic irregularity 17 may be an indeterminate form.

If the light deflection elements 18 are disposed at a distance, when the light guide body 7 is observed from the viewer side F, each of the light deflection elements 18 may be visually recognized.

The reason is that, since light having a light introduction angle which is deflected by the light deflection elements 18, of the light that is introduced into the inside of the light guide body 7, is emitted from the emission face 7b, the light deflection elements 18 are observed as being bright and the flat surface is observed as being dark by a viewer.

Therefore, since the flat portion on which the light deflection elements 18 are not disposed is observed as being bright as a result of providing the microscopic irregularities 17 between the light deflection elements 18, each of the light deflection elements 18 is prevented from being visually recognized.

Furthermore, the microscopic irregularities 17 deflect light so that a light guide direction that is impossible to rise up by use of only the light deflection elements 18 arranged on the light guide body 7 is directed to the emission face 7b; that is, the microscopic irregularities deflect light of the introduced light into the light guide body 7, which cannot be guided toward the emission face 7b, and can also allow such light to be emitted from the emission face 7b; therefore, emission efficiency of the light guide body 7 is also improved.

Furthermore, the microscopic irregularities 17 may be line-shaped irregularities.

In addition, it is desirable that a direction in which the microscopic irregularities 17 extend be a direction that is substantially orthogonal to the X-direction (Y-direction, second direction).

The reason is to facilitate the function of optical path control elements 19 formed on the emission face 7b of the light guide body 7, which will be described later.

Moreover, the microscopic irregularities 17 are line-shaped irregularities, and the extending direction may be the X-direction.

In the case where the microscopic irregularities 17 extend in the X-direction, light is deflected so that a light guide direction that is impossible to rise up by use of only the light deflection elements 18 is directed to the emission face 7b; that is, the microscopic irregularities deflect light of the introduced light into the light guide body 7, which cannot be guided toward the emission face 7b, and can allow such light to be emitted from the emission face 7b; therefore, emission efficiency of the light guide body 7 is improved.

In contrast, the optical path control elements 19 are formed on the emission face 7b of the light guide body 7.

The optical path control elements 19 have an effect of guiding the light incident to the light guide body 7 from the light sources 6 through the incidence face 7L so as to control the light that is to be emitted from the emission face 7b.

The optical path control elements 19 have a prism shape or a lenticular lens shape which unidirectionally extends, and the extending direction thereof is substantially orthogonal to the X-direction (Y-direction).

Here, "substantially orthogonal to a direction" means that an angle formed between the X-direction and the Y-direction is in a range of 90 degrees (orthogonal) ±10 degrees (in a range of 80 to 100 degrees).

That is, the direction in which the optical path control elements 19 extend substantially coincides with an optical axis direction of the light emitted from the light sources 6.

An angle misalignment which is due to manufacture of the light guide body 7 may occur, or an inclined angle may be provided in order for prevention of moiré when a plate, a sheet, or the like, having a regular configuration provided at the emission face side 7b of the light guide body 7 (position close to the emission face 7b), are disposed.

Here, in the case where the direction in which the optical path control elements 19 extend is in the range of 90 degrees±10 degrees relative to the X-direction, the characteristics of the illumination device 3 of the embodiment of the invention which will be described later are not significantly degraded.

In the illumination device 3 of the embodiment of the invention, a reflective plate 5 may be provided on the light deflection face side 7a of the light guide body 7 (position close to the light deflection face 7a) depending on the purpose of use.

The light that is introduced into the light guide body 7 from the light sources 6 through the incidence face 7L is deflected by the light deflection elements 18 formed on the light deflection face 7a, and emitted from the emission face 7b; however, part of light is not reflected by the light deflection elements 18 and is refracted thereby and transmitted therethrough.

For this reason, since the effect of causing the light emitted from the light deflection face 7a to re-enter the light guide body 7 is obtained as a result of providing the reflective plate 5 at the light deflection face side 7a, it is possible to increase an amount of light emitted to the viewer side F.

The constitution of the reflective plate 5 is not particularly limited, for example, a commonly-used white reflective plate 5 or a specular reflection plate 5 is used as such a reflective plate 5.

Alternatively, a structural reflective plate 5 at which a prism shape is formed may be used.

Additionally, the illumination device 3 of the embodiment of the invention may be provided with one or more transmissive optical sheets 8 at the emission face side 7b of the light guide body 7.

A sheet, which serves as the transmissive optical sheet 8 and has a function of diffusing, collecting, or absorbing light emitted from the emission face 7b of the light guide body 7, or separating polarized light, can be suitably arranged depending on the purpose of use in the illumination device 3 of the embodiment of the invention.

Hereinbelow, the light guide body 7 constituting the illumination device 3 of the embodiment of the invention will be described in detail.

Figure 2A:
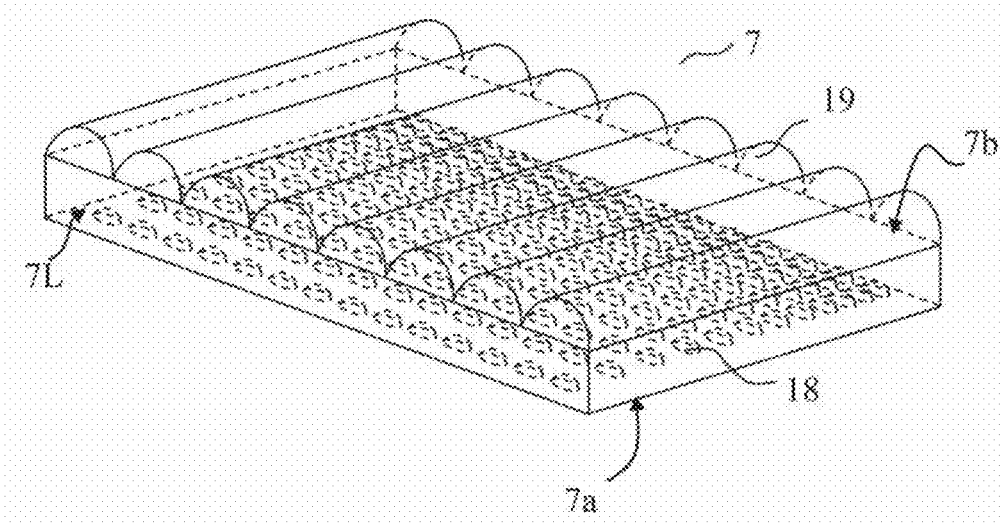
FIG. 2A is a perspective view showing a light guide body of the embodiment of the invention.

FIG. 2A is a perspective view showing the light guide body 7.

Figure 2B:
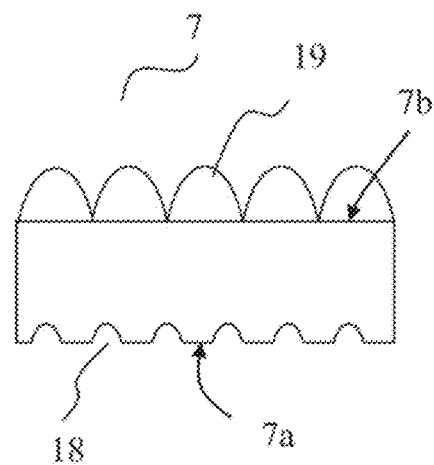
FIG. 2B is a view as seen from a side end face of the light guide body of the embodiment of the invention.
Figure 2C:
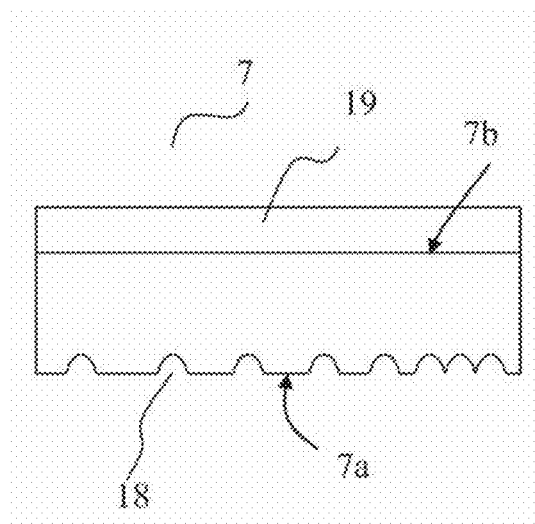
FIG. 2C is a view as seen from a side end face of the light guide body of the embodiment of the invention.

FIGS. 2B and 2C are side views showing the light guide body 7.

The light deflection elements 18 are formed on the light deflection face 7a of the light guide body 7.

A shape of the light deflection element 18 may be a true circle, an ellipsoidal micro lens shape, or a polygonal prism shape as typified by a pyramid shape.

Moreover, a shape of the light deflection element 18 may be concave or convex.

FIGS. 2A to 2C show the cases where the light deflection element 18 has a concave ellipsoidal micro lens shape.

Figure 3:
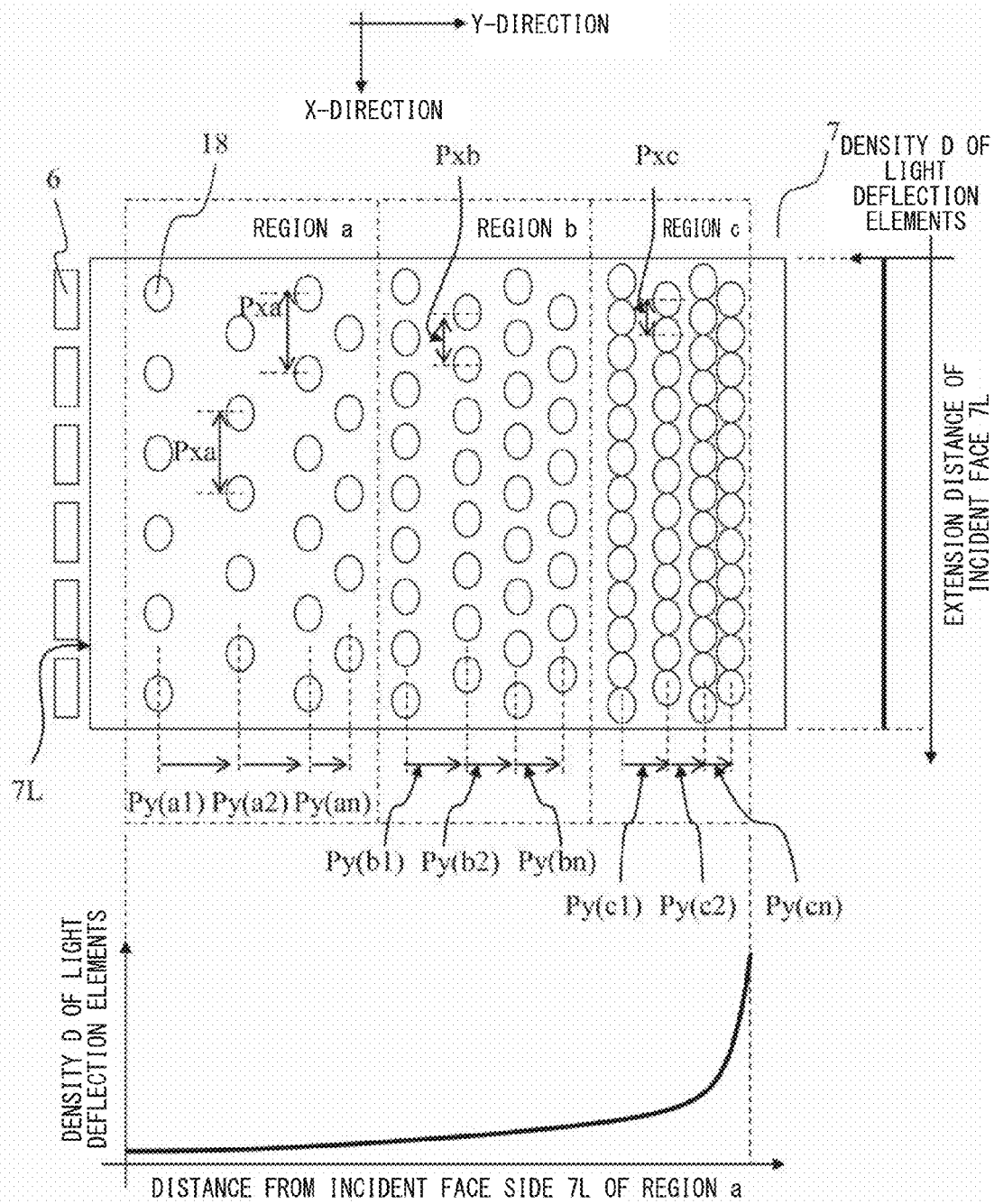
FIG. 3 is a view illustrating an arrangement pattern of light deflection elements.

FIG. 3 is a top view showing the light guide body 7 as seen from the light deflection face side 7a.

An arrangement of the light deflection elements 18 which are formed on the light deflection face 7a of the light guide body 7 will be described in detail using FIG. 3.

A plurality of light deflection elements 18 are formed on the light deflection face 7a of the light guide body 7 constituting the illumination device 3 of the embodiment of the invention.

The density D of the light deflection elements which represents the number of the light deflection elements 18 being present per unit area in the extending direction of the incidence face 7L (X-direction) is substantially constant. On the other hand, the density D increases with an increase in a distance from the incidence face 7L to the position at which the light deflection elements 18 are arranged in the Y-direction.

That is, a sparse-and-dense distribution (a density distribution of the light deflection elements 18 including a high density area and a low density area) is obtained such that: the closer to the incidence face 7L, the lower the density of the light deflection elements 18 becomes, and the more the distance from the incidence face 7L, the higher the density of the light deflection elements 18 becomes.

The problem in a conventional case where the density D of the light deflection elements in the X-direction is constant and the means of the invention for solving the problem will be described hereinbelow.

Here, the arrangement pattern of the light deflection elements 18 is separated into a plurality of regions as shown in FIG. 3.

As an example, FIG. 3 shows the case where a region is separated into three regions of the regions a to c; however, the invention is not limited to this configuration, and the division number thereof and the size of the region may be adequately selected by a designer.

Additionally, of two regions a and b of the regions a to c, the region a that is close to the incidence face 7L corresponds to a first region and the region b that is separated from the incidence face 7L corresponds to a second region.

Of two regions b and c, the region b that is close to the incidence face 7L corresponds to a first region and the region c that is separated from the incidence face 7L corresponds to a second region.

In one region, the light deflection elements 18 are arranged in the X-direction at a constant pitch.

In contrast, as the light deflection elements 18 separate from the incidence face 7L, the interval of the light deflection elements 18 in the Y-direction decreases and the density D of the light deflection elements increases.

As an example, in the explanation with reference to the region a shown in FIG. 3, the intervals of the light deflection elements 18 in the X-direction are Pxa in any location.

On the other hand, the interval of the light deflection elements 18 in the Y-direction varies in the direction from the position close to the incidence face 7L to the position apart from the incidence face 7L, such as Py(a1), Py(a2), ... Py(an); as the positions of the light deflection elements 18 separate from the incidence face 7L, the interval of the light deflection elements 18 becomes smaller.

Next, in the region b, the intervals of the light deflection elements 18 in the X-direction are Pxb in any location, and the interval Pxb in the region b is smaller than the interval Pxa in the region a.

This means that, at the boundary between the region a and the region b, the interval in the X-direction discontinuously varies, and the number of the light deflection elements 18 per unit row which align in the X-direction in the region b is greater than that of the region a.

As stated above, as a result of varying the intervals of the light deflection elements 18 in the X-direction for each region, visibility of the light deflection elements 18 is reduced, and the illumination device 3 having a high degree of luminance can be obtained.

Furthermore, the interval of the light deflection elements 18 at the boundary between two regions is determined so that the interval in the Y-direction in the position closest to the boundary of the region apart from the incidence face 7L is larger than the interval in the Y-direction in the position closest to the boundary of the region close to the incidence face 7L.

Specifically, at the boundary between the region a and the region b, the interval is set such that the interval Py(b1) is larger than the interval Py(an).

Particularly, the interval of the light deflection elements 18 in the Y-direction continuously varies in the same region; however, the interval in the Y-direction discontinuously varies at the boundary between two regions.

In contrast, a length of the interval in the Y-direction in the position close to the incidence face 7L for each region, that is, the interval in the Y-direction (indicating Py(a1), Py(b1), and Py(c1) in FIG. 3) which is adjacent to the boundary close to the incidence face 7L (including a left chain line that delimits the region a in FIG. 3) is not particularly limited.

Furthermore, a length of the interval in the Y-direction in the position apart from the incidence face 7L for each region, that is, the interval in the Y-direction (indicating Py(an), Py(bn), and Py(cn) in FIG. 3) which is adjacent to the boundary apart from the incidence face 7L (including a right chain line that delimits the region c in FIG. 3) is not particularly limited.

Here, a calculation range of the density D of the light deflection elements is described.

If a surface area range that is used to calculate the density D of the light deflection elements is limited to a microscopic range, there is a possibility that the densities D may become different depending on the positions at which the density D is set. Conversely, if a surface area range that is used to calculate the density D of the light deflection elements is set to a wider range, a lot of densities D are averaged regardless of the positions at which the density D is set.

As an example, FIG. 4 illustrates a schematic diagram that relates to an array of the light deflection elements 18 in the X-direction and a calculated surface area range of the density D of the light deflection elements.

In the embodiment, since the arrangement interval Px in the X-direction is constant in the same region, the density D of the light deflection elements is constant, the range used to calculate the density D does not depend on a length in the X-direction.

In contrast, as the positions at which the light deflection elements 18 are arranged in the same region separate from the incidence face 7L, the arrangement interval Py in the Y-direction decreases.

Accordingly, the density D of the light deflection elements is determined by the distance between adjacent light deflection elements 18.

That is, the density D of the light deflection elements is determined by the range surrounded by a dotted line shown in FIG. 4.

In FIG. 4, a surface area of the boundary between the region a and the region b is represented by R(m).

For this reason, at the boundary between the region a and the region b, the distance in the Y-direction between the light deflection element 18 that is arranged at the region a and the light deflection element 18 that is arranged at the region b is calculated so that the density D of the light deflection elements continuously varies.

Next, visibility of the light deflection elements 18 will be described below with reference to the following drawings.

The light that enters from the light source 6 to the light guide body 7 is guided into the inside of the light guide body 7, the light path thereof is deflected by the light deflection elements 18, and the light is emitted from the emission face 7b.

Consequently, when the light guide body 7 is observed from the viewer side F in detail, each of the light deflection elements 18 is visually recognized as being bright.

In order to prevent such visibility of the light deflection elements 18, generally, a transmissive optical sheet 8 as typified by a diffusion sheet or a prism sheet is disposed on the emission face 7b of the light guide body 7; however, even where the transmissive optical sheet 8 is disposed, the light deflection elements 18 may be visually recognized depending on where the light deflection elements 18 are arranged.

Figure 5A:
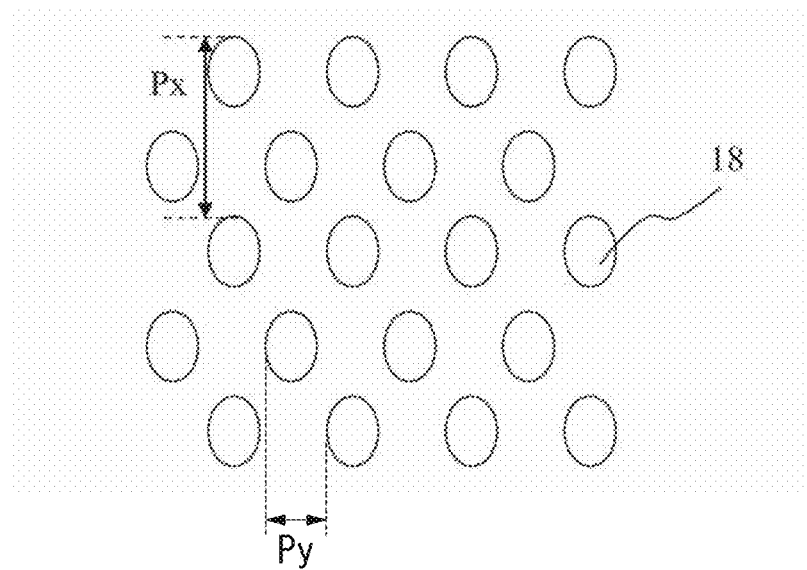
FIG. 5A is a diagram illustrating visibility of the light deflection elements.

FIG. 5A shows an example of an arrangement of the light deflection elements 18 which are difficult to be visually-recognized.

For simplification, FIG. 5A shows an arrangement of the light deflection elements 18 having a constant interval in both the X-direction and Y-direction (Px and Py, respectively).

It is preferable that the ratio Py/Px of the interval Py of the light deflection elements 18 in the Y-direction to the interval Px thereof in the X-direction be in the range of 0.2 to 1.0.

Figure 5B:
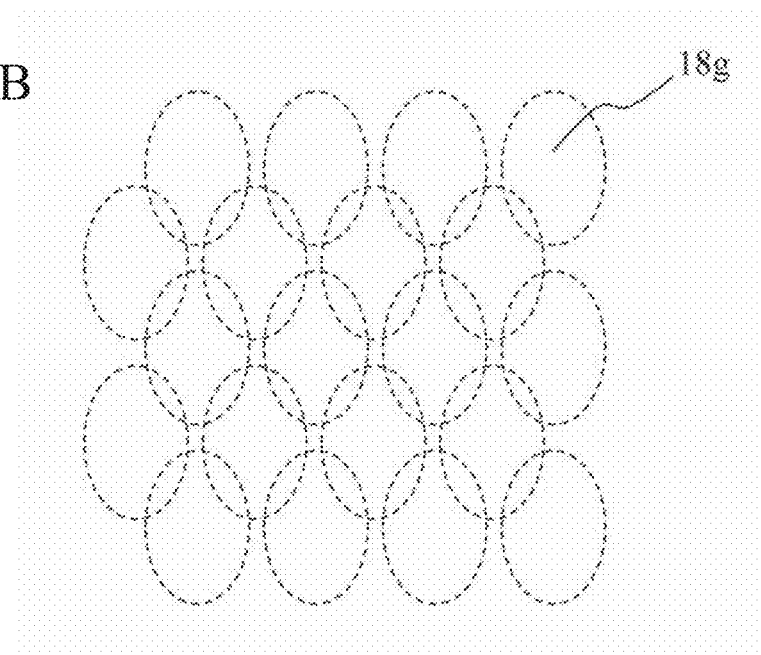
FIG. 5B is a diagram illustrating a diffusion image of the light deflection elements.

When the Py/Px is set within this range, for example, in the case of providing a diffusion sheet serving as the transmissive optical sheet 8 on the light emission face 7b of the light guide body 7, since the diffusion images 18g that occur due to the light scattered by the light deflection elements 18 as shown in FIG. 5B overlap each other, it is possible to reduce the visibility of the light deflection elements 18.

Figure 6A:
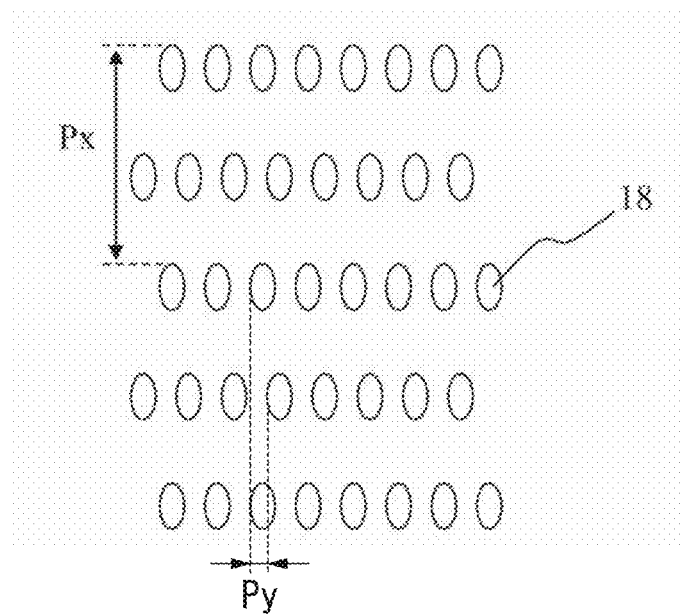
FIG. 6A is a diagram illustrating visibility of the light deflection elements.

FIG. 6A shows the case of Py/Px≈0.1 as an example.

Figure 6B:
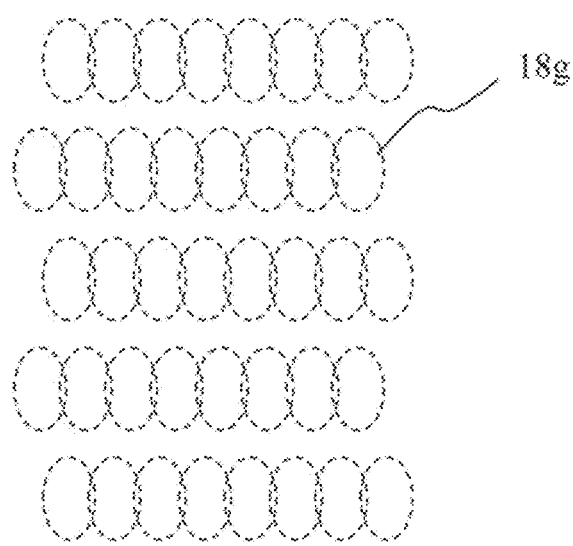
FIG. 6B is a diagram illustrating a diffusion image of the light deflection elements.

In the case of this arrangement, even where a diffusion sheet serving as the transmissive optical sheet 8 is provided on the light emission face 7b of the light guide body 7, the diffusion images 18g that occur due to the light diffused by the light deflection elements 18 overlap in the Y-direction as shown in FIG. 6B, however, a gap therebetween in the X-direction occurs.

As a result, since the light deflection elements 18 are visually recognized as being linear light extending in the Y-direction, it is not preferable.

Figure 7A:
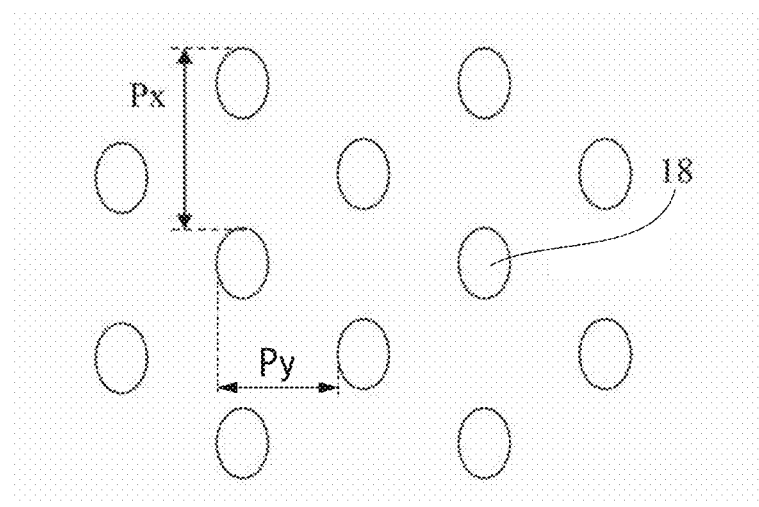
FIG. 7A is a diagram illustrating visibility of the light deflection elements.

On the other hand, FIG. 7A shows the case of Py/Px≈1.1 as an example.

Figure 7B:
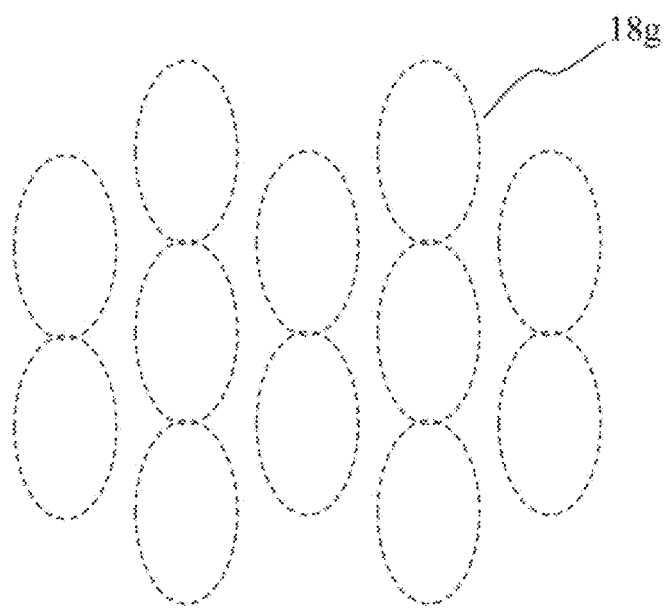
FIG. 7B is a diagram illustrating a diffusion image of the light deflection elements.

In the case of this arrangement, even where a diffusion sheet serving as the transmissive optical sheet 8 is provided on the light emission face 7b of the light guide body 7, the diffusion images 18g that occur due to the light diffused by the light deflection elements 18 overlap in the X-direction as shown in FIG. 7B, however, a gap therebetween in the Y-direction occurs.

As a result, since the light deflection elements 18 are visually recognized as being linear light extending in the X-direction, it is undesirable.

The arrangement pattern of the light deflection elements 18 of the light guide body 7 of the embodiment of the invention is separated into a plurality of regions, the light deflection elements 18 in the X-direction are arranged in the region at a constant pitch, and the light deflection elements 18 in the Y-direction are arranged such that the interval thereof decreases with an increase in a distance from the incidence face 7L.

Here, as a result of dividing the region, determining an interval in the X-direction, and varying an interval in the Y-direction so that the ratio of the interval in the Y-direction to the interval in the X-direction is in the range of 0.2 to 1.0, it is possible to reduce visibility of the light deflection elements 18.

Next, a constitution that realizes a high degree of luminance in the illumination device 3 related to the embodiment of the invention will be described below with reference to the following drawings.

Figure 8:
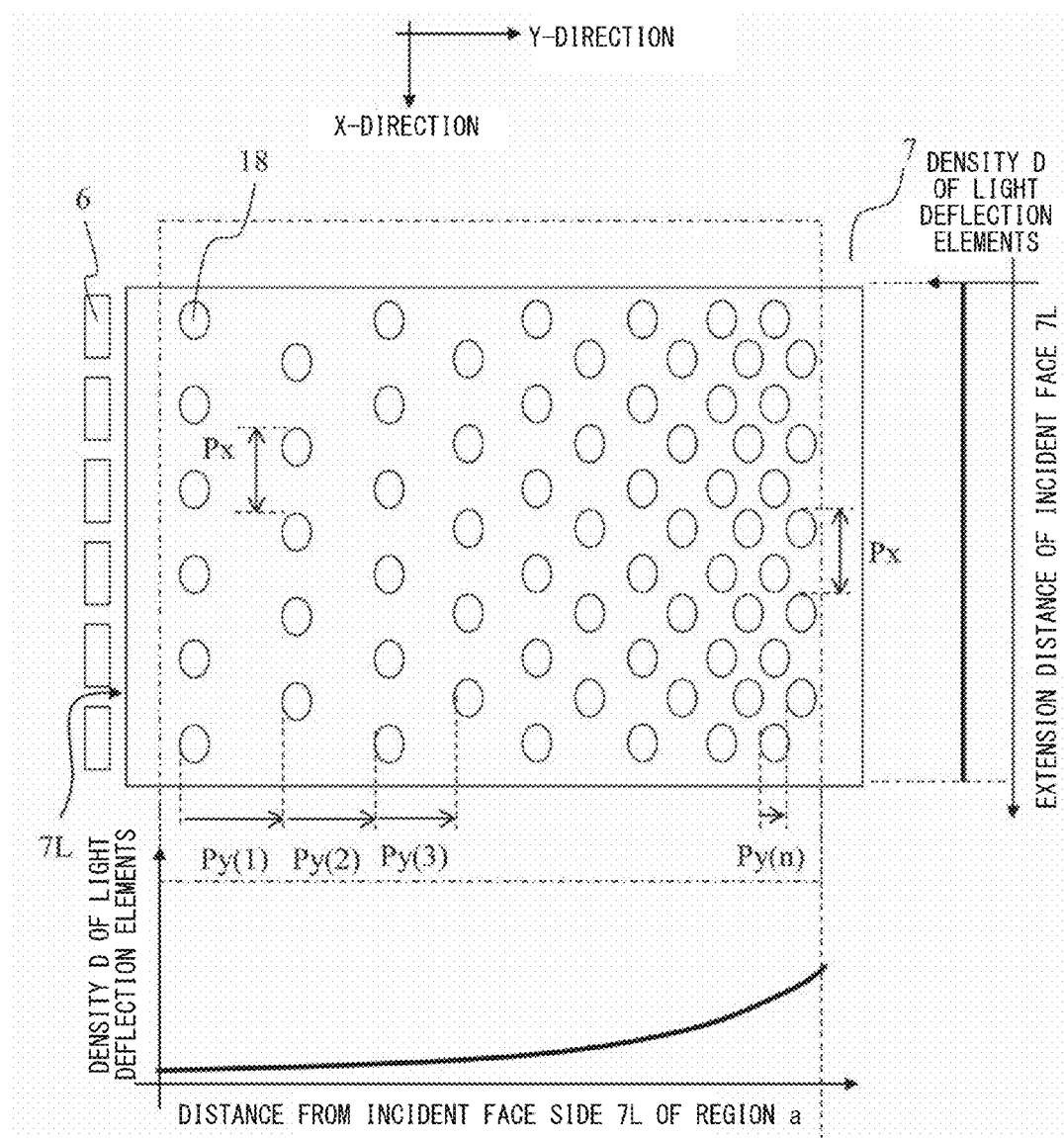
FIG. 8 is a view illustrating an arrangement pattern of light deflection elements.

FIG. 8 shows an example case where the light deflection elements 18 are arranged without separating the arrangement pattern of the light deflection elements 18 into a plurality of regions.

Here, an interval in the X-direction is determined based on the density D of the light deflection elements in the position close to the incidence face 7L.

The interval Py(i) in the Y-direction decreases with an increase in a distance from the incidence face 7L to the position at which the light deflection elements 18 are arranged; however, since the interval Px is large, the density D of the light deflection elements does not increase even at the position that is furthest from the incidence face.

That is, the light incident to the light guide body 7 from the incidence face 7L cannot be emitted from the emission face 7b, and most of light leaks from the surface of the light guide body 7 which is opposite to the incidence face 7L.

For this reason, since the illumination device 3 having a high degree of luminance cannot be obtained, it is not undesirable.

Figure 9:
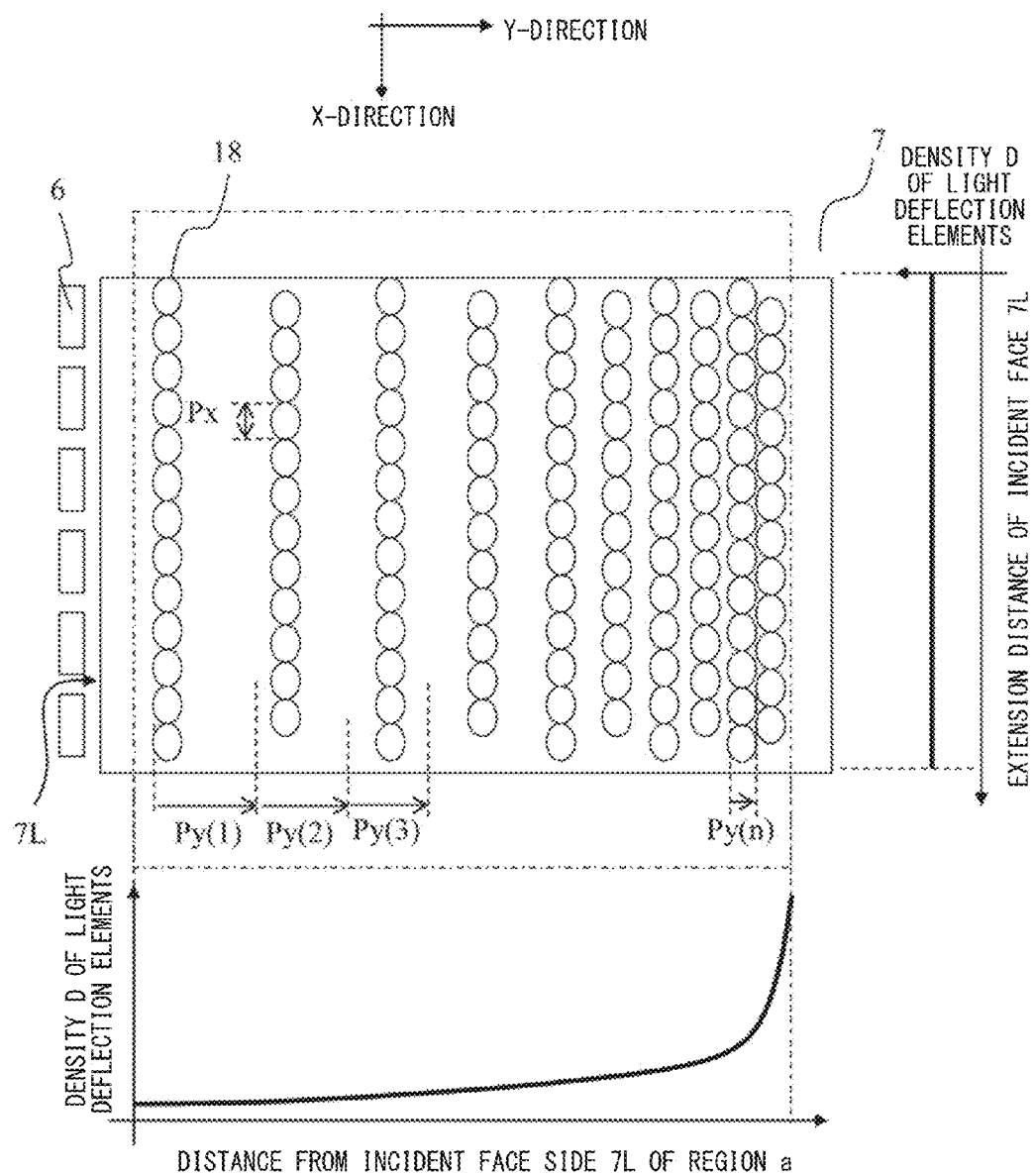
FIG. 9 is a view illustrating an arrangement pattern of light deflection elements.

On the other hand, FIG. 9 shows another example case where the light deflection elements 18 are arranged without separating the arrangement pattern thereof into a plurality of regions.

The interval in the X-direction is determined with reference to the density D of the light deflection elements at the position that is furthest from the incidence face 7L.

In the case of arranging the light deflection elements 18 at such an interval, since a great extent of light that is incident from the incidence face 7L to the light guide body 7 can be emitted from the emission face 7b, the illumination device 3 having a high degree of luminance can be obtained.

However, since the interval in the Y-direction at the position close to the incidence face 7L extremely increases, there is a significant problem in terms of visibility of the aforementioned light deflection elements 18.

That is, since the light deflection elements 18 are visually recognized as being linear light extending in the X-direction, it is not preferable.

The arrangement pattern of the light deflection elements 18 of the light guide body 7 which constitutes the illumination device 3 of the embodiment of the invention, is arranged in the region in the X-direction at a constant interval, and is placed so that the interval of the light deflection elements 18 in the Y-direction decreases with an increase in a distance from the incidence face 7L to the position at which the light deflection elements 18 are arranged.

Additionally, the interval is set such that the interval in the X-direction becomes large in the region close to the incidence face 7L and the interval becomes smaller in the direction from the region close to the incidence face 7L to the region apart from the incidence face 7L.

As a result, visibility of the light deflection elements 18 is reduced, and the illumination device 3 having a high degree of luminance can be obtained.

Furthermore, each of the regions may include a plurality of regions separated in the X-direction.

The reason is that it is possible to reduce unevenness in surface luminance with a higher degree of accuracy by separating the regions, which align in the Y-direction, in the X-direction.

Figure 10A:
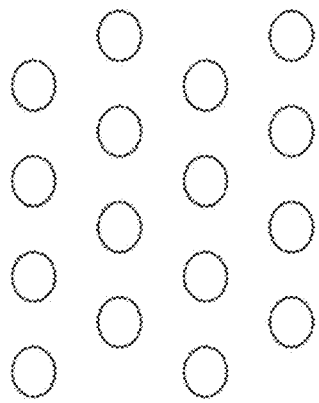
FIG. 10A is a view illustrating an arrangement of light deflection elements.

Particularly, regarding an array pattern of the light deflection elements 18 in the X-Y-directions, in the light guide body 7 of the embodiment as shown in FIG. 10A, the light deflection elements 18 are arranged in the Y-direction so that the rows of the light deflection elements 18 in the X-direction are alternately displaced by ½ of the arrangement interval Px in the X-direction.

However, an array pattern of the light deflection elements 18 is not limited.

Figure 10B:
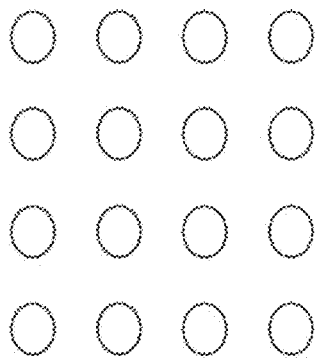
FIG. 10B is a view illustrating an arrangement of light deflection elements.

For example, as shown in FIG. 10B, the light deflection elements 18 may be aligned without being displaced in the X-direction.

Figure 10C:
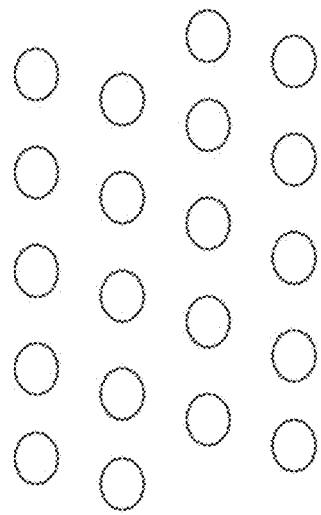
FIG. 10C is a view illustrating an arrangement of light deflection elements.

Alternatively, as shown in FIG. 10C, the light deflection elements 18 may be aligned by being slightly displaced in the X-direction.

Furthermore, displacement in the light deflection elements 18 in the X-direction may be randomly provided.

On the other hand, in consideration of a different transmissive optical sheet 8 that is to be provided at the emission face side 7b of the light guide body 7, as a result of adopting a structure which has randomly-displaced light deflection elements 18 adjacent to each other in the light deflection elements 18 that are aligned in the X-direction, moiré does not occur, and it is thereby preferable.

The light deflection elements 18 formed on the light deflection face 7a of the light guide body 7, which constitutes the illumination device 3 of the embodiment of the invention, are distributed in a sparse-and-dense distribution such that: as the position at which the light deflection elements 18 are arranged becomes closer to the incidence face 7L, the light deflection elements become sparse (the density thereof is low); and as the position thereof becomes apart from the incidence face 7L, the light deflection elements become dense (the density thereof is high).

In the case of applying the illumination device 3 of the embodiment of the invention to a backlight unit of a liquid crystal display or the like, it is desirable to increase luminance of the center of the surface thereof while maintaining an in-plane uniformity in luminance within a predetermined standard.

The inventor conducted diligent research of a sparse-and-dense configuration (a constitution and a method of arranging light deflection elements by adjusting a size, a position, a shape, a density, or the like of the light deflection elements), and as a result, found a method of obtaining a sparse-and-dense distribution with a high degree of luminance at the center of the surface without sacrificing an in-plane uniformity in luminance of the illumination device 3.

The density of the light deflection elements which represents the number of the light deflection elements 18, which are formed on the light deflection face 7a of the light guide body 7 and are present per unit area, is represented as D.

The function of reciprocal number $1/D(y)$ which is based on the density function $D(y)$ with reference to a distance y from the incidence face 7L at which a closest light source 6 is disposed is represented by mainly summing two functions of a first function $F(y)$ and a second function $S(y)$.

Here, the first function $F(y)$ monotonically decreases with respect to the distance y, while the second function $S(y)$ repeatedly decreases and increases several times with respect to the distance y, an absolute value of a maximum amplitude value for each cycle thereof monotonically decreasing, and the illumination device 3 having a high degree of luminance at the center of the surface while maintaining an in-plane uniformity in luminance can be thereby obtained.

This effect will be described with reference to FIG. 11.

Figure 11:
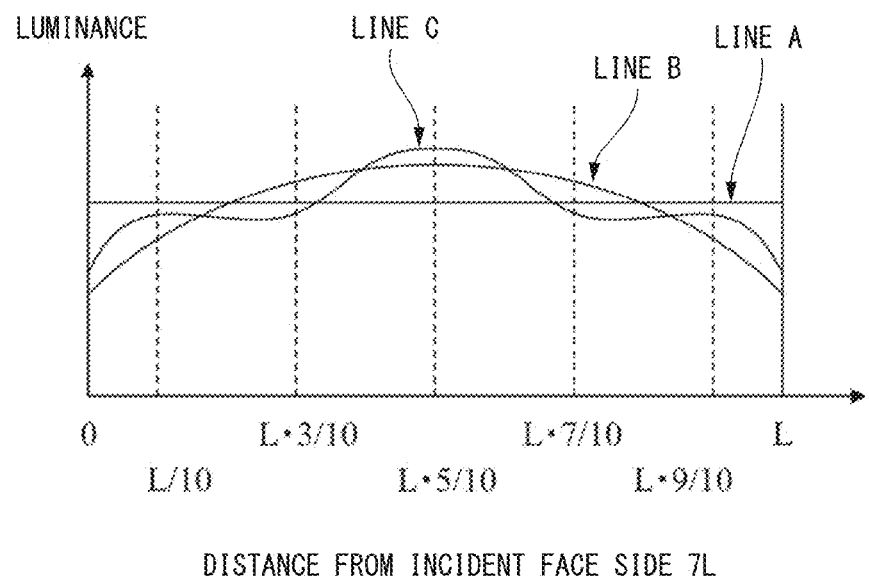
FIG. 11 is a chart illustrating unevenness in surface luminance and center luminance of the embodiment of the invention.

FIG. 11 is a chart illustrating a luminance distribution of the illumination device 3 of the embodiment of the invention.

FIG. 11 illustrates a luminance distribution in cross-section in an optical axis direction of light emitted from the light sources 6 in order to attract attention to a difference in luminance of the center of the surface thereof by use of a method of arranging the light deflection elements 18 of the embodiment of the invention.

In FIG. 11, a horizontal direction (X-axis) represents a distance y from the incidence face 7L, and a vertical direction (Y-axis) represents luminance.

Furthermore, in an example shown in FIG. 11, one face of four side end faces forming the light guide body 7 corresponds to the incidence face 7L.

In the illumination device 3, a most desirable luminance distribution has the same luminance at all positions as indicated by line A; however, generally, it is difficult to obtain an illumination device 3 having exactly the same luminance at all positions of an in-plane thereof.

Additionally, regarding a display, even where an amount of light emitted from the entire surface of the illumination device 3 is uniform, as a result of applying the illumination device 3 having a high degree of luminance at the center of a screen thereto, it appears as a bright display when a human observes the screen with the eye.

Consequently, an illumination device 3 is desired to have a highest luminance at the center position of the face.

For this reason, generally, a standard of an in-plane uniformity in luminance is determined, and an illumination device in which the light deflection elements 18 are arranged is designed so that luminance at the center of the surface becomes highest in the range of the standard.

The standard of the in-plane uniformity in luminance is suitably determined depending on users, and is often evaluated based on the ratio between a maximum luminance and a minimum luminance by use of in-plane multi-spot luminance measurement.

In the following description, with reference to FIG. 11, the luminance measurement point is represented as 0 at the position of the incidence face 7L and is L at the position of the side end face on the opposite side of the incidence face 7L, and five points of a position of L/10, a position of L×3/10, a position of L×5/10 (the center of the surface), a position of L×7/10, and a position of L×9/10 will be described.

In a sparse-and-dense configuration of a conventional light deflection element 18 (an arrangement of the light deflection elements 18 including a high density area and a low density area), the function of reciprocal number $1/D(y)$ of the density function $D(y)$ of the light deflection elements monotonically decreases with respect to the distance y.

That is, the above-described first function $F(y)$ is established.

By arranging the light deflection elements 18 as stated above, a parabolic luminance distribution is obtained in which the luminance of the center of the surface (the position of L×5/10) is highest as indicated by line B shown in FIG. 11.

In such a distribution, the illumination device 3 having the luminance at the screen center position (L×5/10) which is higher than that of the line A can be obtained.

At this time, the positions of L/10 and L×9/10 represent the minimum value, and the light deflection elements 18 are arranged so that the ratio of the maximum value to the minimum value is greater than or equal to 80%.

According to the sparse-and-dense configuration of the light deflection elements 18 which is found by the inventor, the inverse function $1/D(y)$ of the density function $D(y)$ of the light deflection elements is represented by the sum of the first function $F(y)$, that monotonically decreases with respect to the distance y, and the second function $S(y)$ that repeatedly decreases and increases with respect to the distance y.

Because of this, a distribution is obtained in which, other than the screen center position (L×5/10), peak occurs as indicated by line C.

FIG. 11 illustrates the configuration of the light deflection elements 18 in which three peaks occur as an example; however, the invention is not limited to this example.

The number of peaks can be optionally selected according to a cycle of the second function $S(y)$.

At this time, the luminance at the screen center position (L×5/10) is the maximum value, and it is confirmed that the luminance is higher than that of the line B representing a conventional luminance distribution.

Furthermore, the ratio of the maximum value to the minimum value can be ensured to be greater than or equal to 80% similar to the line B.

Next, the first function $F(y)$ constituting the inverse function $1/D(y)$ of the function $D(y)$ of the light deflection elements will be described.

The first function F(y) monotonically decreases with respect to the distance y, and this function is independently designed so as to obtain a parabolic luminance distribution as indicated by the line B.

The reason is that, as a result of adding the second function S(y) that repeatedly decreases and increases to the first function F(y) that obtains the parabolic luminance distribution, it is possible to provide the peak position at the center position of the face (L×5/10).

Therefore, where the maximum value of the distance y is represented as Ymax, variation in the differential value dF(y)/dy of the first function F(y) is desirable to be less than or equal to twice the average value of the differential value dF(y)/dy in the range of 0<y/Ymax<0.9.

The reason is that, if it exceeds twice, a desired parabolic luminance distribution cannot be obtained.

Particularly, in the case of obtaining a parabolic luminance distribution so that the screen center position (L×5/10) is a luminance maximum value in the light guide body 7 having one of side end faces of four incidence faces 7L, it is desirable that variation in the differential value dF(y)/dy of the first function F(y) at the screen center position (L×5/10) be substantially equal to the average value of the differential value dF(y)/dy.

Here, the reason that the aforementioned range is y/Ymax<0.9 will be described.

As shown in FIG. 9, in the case where one face of four side end faces forming the light guide body 7 is the incidence face 7L, generally, a reflective sheet is attached to the side end face that is located opposite to the incidence face 7L, or a reflective plate is provided at the position close to the side end face that is located opposite to the incidence face 7L.

Consequently, it is necessary to design the light deflection elements 18 so that the configuration of the light deflection elements 18 adjacent to Ymax is deviated from the above-mentioned condition.

For the above-described reason, the above-mentioned range is set to y/Ymax<0.9.

Moreover, in the case where one face of four side end faces forming the light guide body 7 is the incidence face 7L, Ymax is equal to the surface position L that is located opposite to the incidence face 7L.

In the case where the incidence faces of the light guide body 7 are, for example, two faces which are located opposite to each other, the position of Ymax is the center position of the face (L×5/10).

Subsequently, the second function S(y) constituting the inverse function 1/D(y) of the function D(y) of the light deflection elements will be described.

As described above, the number of luminance peak positions can be optionally set as necessary; however, particularly, it is preferable to obtain a three-peak shape as shown in FIG. 11.

Furthermore, in order to allow the maximum peak position to correspond to the center position of the face (L×5/10), a decrease-and-increase repetition period of the second function S(y) is desirably within the range of 0.7×L/2.5 to 1.2×L/2.5.

In the case where the repetition period is deviated from the above range, the maximum peak position is displaced from the center position of the face (L×5/10), and a result that does not match the aim of the invention occurs.

The most desirable condition is 1×L/2.5.

That is, it is desirable that the light deflection elements 18 be arranged so as to obtain an amplitude of vibration of 2.5 periods in the direction from the incidence face 7L to the surface position L that is on the opposite side of the incidence face 7L.

At this time, five half-periods (0.5 period×5) which form 2.5 periods may be different from each other.

Additionally, if the contribution ratio of the second function S(y) with respect to the inverse function 1/D(y) of the function D(y) of the light deflection elements increases, the amplitude of vibration of a luminance peak increases, and it is possible to further locally increase luminance; however, in-plane uniformity in luminance becomes degraded.

Consequently, where the position at which the differential value dS(y)/dy of the second function S(y) becomes 0 is represented as yλi (i=1, 2, . . . n), it is desirable that $0.01 \times F(y\lambda i) < |S(y\lambda i)| < 0.1 \times F(y\lambda i)$ be satisfied.

In the case of being greater than this range, the amplitude of vibration of the luminance peak significantly exceeds, as a result, in-plane uniformity in luminance deteriorates.

As shown in FIG. 11 as an example, the luminances at the positions of L/10, L×5/10, and L×9/10 increase; however, the luminances at the positions of L×3/10 and L×7/10 are degraded.

In the illumination device 3 of the embodiment of the invention provided with the light guide body 7 in which the sparse-and-dense configuration of the light deflection elements 18 is defined by the foregoing density D of the light deflection elements, it is possible to increase luminance at the center of the surface while maintaining uniformity in luminance.

Consequently, the arrangement pattern of the light deflection elements 18 is separated into a plurality of regions, and the light deflection elements 18 in the Y-direction are arranged such that the interval thereof decreases with an increase in a distance from the incidence face 7L and the interval thereof in the X-direction is constant.

As a result, visibility of the light deflection elements 18 is reduced, and the illumination device 3 having a high degree of luminance can be obtained.

Furthermore, each region may include the separated regions in the X-direction.

The reason is that, it is possible to reduce unevenness in surface luminance with a higher degree of accuracy by separating the regions in the X-direction.

On the other hand, the optical path control elements 19 are formed on the emission face 7b of the light guide body.

The optical path control elements 19 are formed in a prism shape or a lenticular lens shape which extend in the Y-direction and are arrayed in the X-direction at a constant pitch.

Here, the optical path control elements 19 may be arrayed with a gap.

FIGS. 2A to 2C show the cases where the optical path control elements 19 are lenticular lenses.

The optical path control elements 19 control a route of light that is introduced into the light guide body 7 and an emission direction of the light emitted from the emission face 7b.

The problem in a conventional case where the density D of the light deflection elements in the X-direction is constant in the light guide body 7 and the means of the invention for solving the problem, which are mentioned above, will be described below.

Figure 12A:
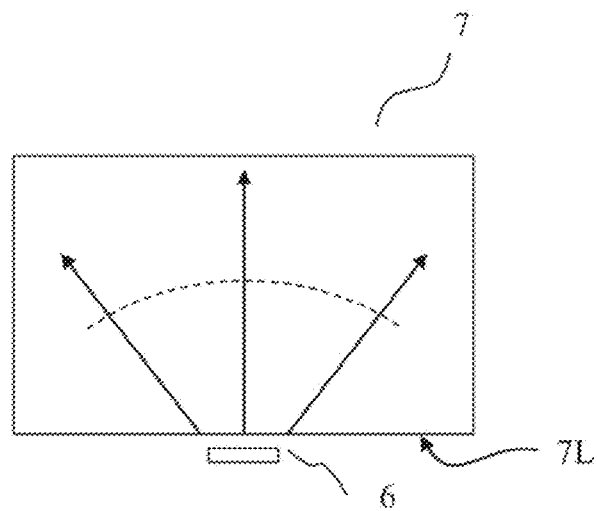
FIG. 12A is a top view showing propagation of light inside the light guide body.
Figure 12B:
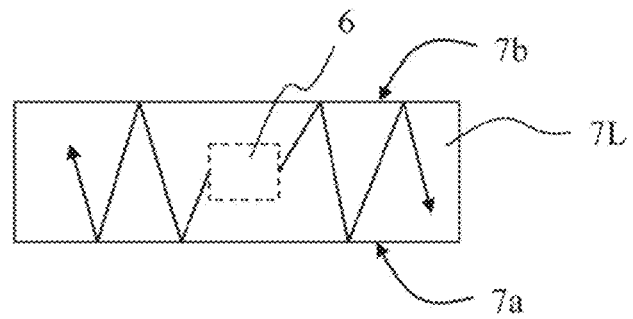
FIG. 12B is a side view showing propagation of light inside the light guide body.

FIGS. 12A and 12B illustrate behavior of light that is introduced into the inside of the light guide body 7 in which the optical path control elements 19 are not provided.

FIG. 12A is a plan view as seen from the emission face side 7b, and FIG. 12B is a side view as seen from the incidence face side 7L.

For simplification, FIGS. 12A and 12B show the case where one light source 6 is placed at the incidence face 7L of the light guide body 7.

In the case the optical path control elements 19 are not provided, light emitted from the light sources 6 is incident to the light guide body 7 through the incidence face 7L and is guided thereby while radially spreading in the light guide body 7.

Figure 14A:
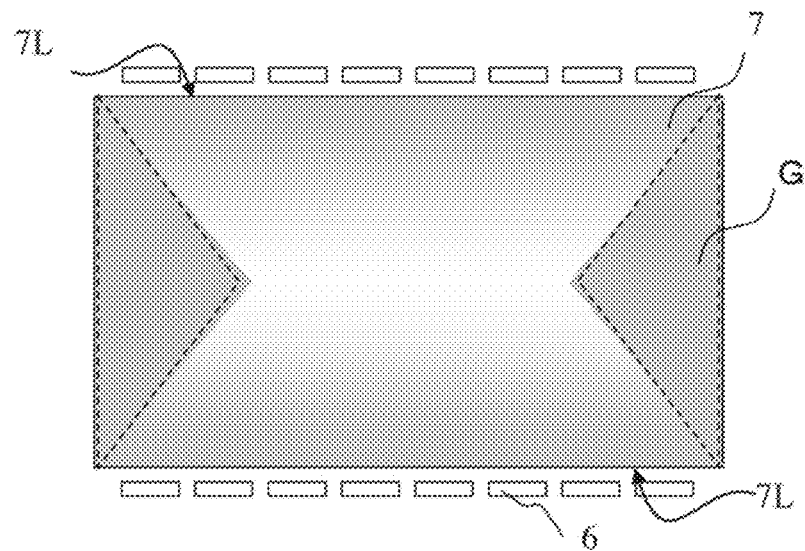
FIG. 14A is a view illustrating a surface luminance distribution of the light guide body on which optical path control elements are not provided.

Here, FIG. 14A is a view illustrating a surface luminance distribution of the light guide body 7 in which the optical path control elements 19 are not provided and two long sides of the light guide body 7 are used as the incidence face 7L as an example.

In the light guide body 7 in which the optical path control elements 19 are not provided, a triangle-shaped dark region G occurs as shown in FIG. 14A.

The reason is that, as shown in FIG. 12A, as a result of the light introduction into the light guide body 7 and radially-spreading of the light entering the light guide body 7 from the light source 6, light emitted from a plurality of light sources 6 overlaps, and light leaks to the exterior from the side end face of the short side at which the light source 6 is not disposed.

Conventionally, there is a problem in that, when a configuration of the light deflection elements 18 is designed, it is difficult to make the density D of the light deflection elements in the X-direction constant, and a sparse-and-dense design of the light deflection elements 18 (designing the arrangement of the light deflection elements 18 so as to include a high density portion and a low density portion) in not only the Y-direction but also the X-direction is required.

Figure 13A:
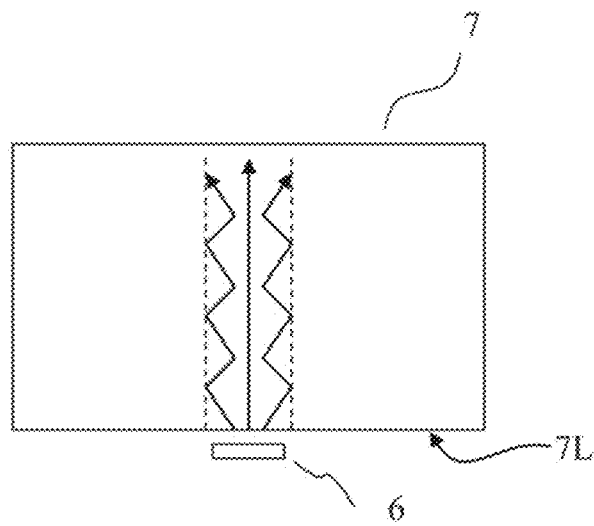
FIG. 13A is a top view showing propagation of light inside the light guide body.
Figure 13B:
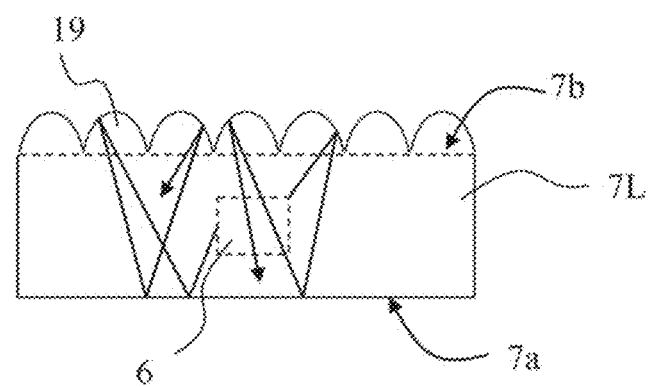
FIG. 13B is a side view showing propagation of light inside the light guide body.

FIGS. 13A and 13B illustrate behavior of light that is introduced into the inside of the light guide body 7 in which the optical path control elements 19 are provided.

FIG. 13A is a plan view as seen from the emission face side 7b, and FIG. 13B is a side view as seen from the incidence face side 7L.

A reflection angle of the light that enters the incidence face 7L from the light source 6 is changed by the inclined surface of the optical path control elements 19, and the light is guided to the Y-direction without radially spreading.

Figure 14B:
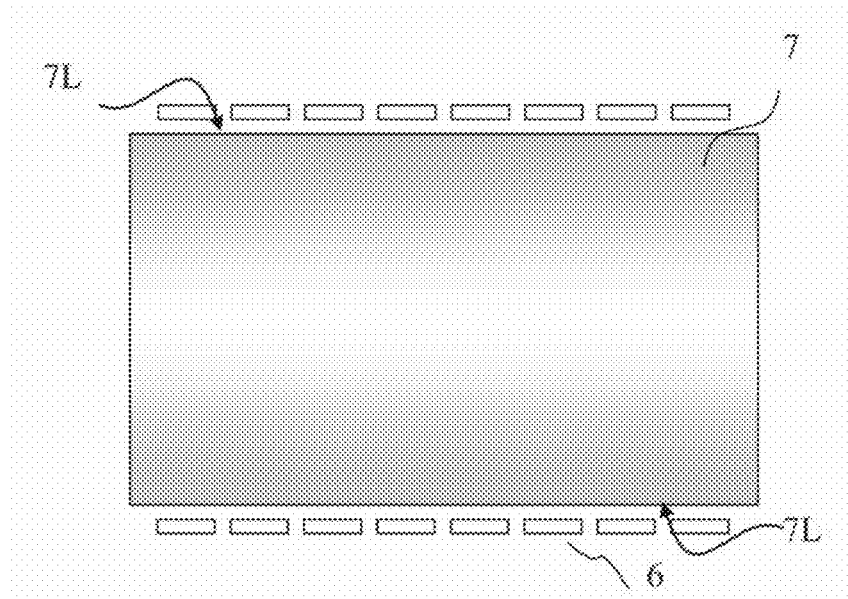
FIG. 14B is a view illustrating a surface luminance distribution of the light guide body of the embodiment of the invention.

FIG. 14B is a view illustrating a surface luminance distribution of the light guide body 7 in which the optical path control elements 19 are provided.

Since the light that enters the incidence face 7L from the light source 6 is guided to the Y-direction without radially spreading, a shadow G does not occur as shown in FIG. 14A.

In addition, leakage light from the side end face of the short side, at which the light source 6 is not disposed, to the exterior does almost not occur, and the illumination device 3 with a high degree of efficiency can be thereby obtained.

In the sparse-and-dense pattern regarding the density D of the light deflection elements of the light guide body 7 that constitute the illumination device 3 of the embodiment of the invention, the closer to the incidence face in the Y-direction, the lower the density of the light deflection elements 18 becomes, and the more the distance from the incidence face, the higher the density of the light deflection elements 18 becomes.

In the X-direction, the density of the light deflection elements 18 is constant.

The arrangement pattern of the light deflection elements 18 is separated into a plurality of regions, the light deflection elements 18 are arranged in the region in the X-direction at a constant pitch, and the light deflection elements 18 are arranged in the Y-direction such that, the more the distance from the incidence face 7L, the smaller the interval thereof becomes.

Furthermore, the interval of the light deflection elements 18 in the X-direction becomes larger with a decrease in a distance from the incidence face 7L, and the interval thereof becomes smaller with an increase in a distance from the incidence face 7L.

As a result, visibility of the light deflection elements 18 is reduced, and the illumination device 3 having a high degree of luminance can be obtained.

Additionally, since the optical path control elements 19 are formed on the emission face 7b, it is possible to reduce generation of a dark region G that occurs in the conventional case where the density D of the light deflection elements in the X-direction is constant, and the illumination device 3 having a high level of uniformity in luminance can be obtained.

As stated above, as a result of a function of controlling the pathway of the light that is introduced into the inside of the light guide body 7, the above-mentioned generation of the dark region G is inhibited, and uniformity in luminance is enhanced; moreover, in the case of applying it to a backlight unit of a liquid crystal display, it is possible to apply, for example, a function of a scanning backlight of a 3D display to the illumination device 3 of the embodiment of the invention.

Additionally, since a light emission area of the illumination device 3 can be controlled by turning on or off the light sources 6, it is also possible to contribute to electric power saving of a liquid crystal display which is due to local dimming.

As a configuration of the optical path control element 19, a prism lens which extends in the Y-direction, aligns in the X-direction, has a triangular shape in cross-section, a polygonal prism lens, or a configuration in which an end of such prism lenses is rounded.

In the case where the optical path control elements 19 have a prism lens shape, light emitted from the emission face 7b is collected, and the illumination device 3 having a high degree of luminance can be obtained.

A cross-sectional shape of the optical path control elements 19 desirably has a curved lenticular lens shape that has a spherical surface or a non-spherical surface.

The reason is that, the light emitted from the emission face 7b is collected by the curved lenticular lens, and not only the illumination device 3 having a high degree of luminance can be obtained but also it is possible to reduce irregularity in light sources which occurs near the entry face 7L.

That is, a plurality of the light sources 6 are arranged at the incidence face 7L of the light guide body 7 at a constant interval; however, irregularity in light sources which is due to an arrangement interval of the light sources 6 occurs near the entry face 7L.

As an angle of tangent on the outline in cross-section of a curved lenticular lens having a spherical surface or a non-spherical surface, various angles with respect to the face of the light guide body 7 may be adopted.

Consequently, since the guided light that is reflected by the curved lenticular lens in the light guide body 7 is reflected at various angles, it is possible to reduce the irregularity in light sources.

Furthermore, the optical path control elements 19 are provided with a function of reducing visibility of the light deflection elements 18.

In the case of applying the illumination device 3 of the embodiment of the invention to a backlight unit used in a display, it is undesirable that the light deflection elements 18 be visually recognized as being a scattered arrangement.

In the case where the optical path control element 19 is a prism lens, an image generated by light that is diffused by the light deflection elements 18 is split.

For example, in the case where the optical path control element 19 is a triangular prism lens, an image of one light deflection element 18 is split into two images.

Accordingly, the visibility of the light deflection elements 18 is easily reduced.

On the other hand, in the case where the optical path control elements 19 is a curved lenticular lens, since the image of point-like light deflection elements 18 is formed in a linear shape, visibility of the light deflection elements 18 is easily reduced.

The optical path control elements 19 extend in the Y-direction and are arrayed in the X-direction at a constant pitch or a random distance.

Here, a space that is a flat surface may be provided between the optical path control elements 19 adjacent to each other.

As long as the space has a width that is less than or equal to 10% of the pitch of the array of the optical path control elements 19, it does not affect a function of reducing the above-mentioned dark region G or a function of controlling an area of the light-emitting face, and reduction in visibility of the light deflection elements 18.

It is more desirable that the space have a width that is less than or equal to 5% of the pitch of the array of the optical path control elements 19.

As a result of providing such a space, the product life of a die used for molding the light guide body 7 prolongs, an occurrence of a molding defect can be reduced, and therefore, it is desirable.

As a shape of the light deflection element 18, a point-like structure is preferably adopted which is to be discretely disposed on a flat surface, such as a concave or convex micro lens shape or a three-dimensional triangle.

The reason is that, it is easy to reduce visibility of the aforementioned light deflection elements 18.

FIGS. 2A to 2C and 3 show the light deflection elements 18 which have substantially an elliptically-shaped bottom surface shown as an example of the invention and are formed in a concave micro lens shape.

Directions of a major axis and a minor axis of the ellipse are not limited, and it is particularly desirable that the short axial direction thereof coincide with the Y-direction.

In the light guide body 7 related to the embodiment of the invention, point-like light deflection elements 18 such as one having a concave or convex micro lens shape or a three-dimensional triangle are discretely disposed on the light deflection face 7a thereof.

The optical path control elements 19, which extend in the Y-direction, align in the X-direction, have a prism shape or a lenticular lens shape, are formed on the emission face 7b.

In the above-description, although each effect of the light deflection elements 18 and the optical path control elements 19 is explained in the embodiment of the invention, the effect which is due to their reciprocal action will be described with reference to the below drawings and numerical formulas.

Where the maximum angle formed between the light deflection face 7a and the tangential line of the cross-sectional shape, when the point-like light deflection element 18 is cut by the surface that is perpendicular to the light deflection face 7a and parallel to the X-direction, is represented as θd; the maximum angle formed between the emission face 7b and the tangential line of the cross-sectional shape, when the optical path control element 19 is cut by the surface that is perpendicular to the emission face 7b and parallel to the X-direction, is represented as θL; and a refractive index of the light guide body 7 is represented as n, if the maximum angle θL of the optical path control element 19 satisfies the range that is defined by the following Formula (1), it is possible to cause the light entering the light guide body 7 to be effectively emitted from the emission face 7b, and to increase light utilization efficiency of the illumination device 3.

(Equation 1)

$$\mathrm{Sin}^{-1}\left(\frac{1}{n}\right) - \theta d \le \theta L \le \frac{\pi}{2} - 2\theta d + \mathrm{Sin}^{-1}\left(\frac{1}{n}\right) \qquad \text{Formula (1)}$$

The light that is incident to the light guide body 7 from the light source 6 is introduced into the light guide body 7 on a three-dimensional optical path.

Where the extending direction of the incidence face 7L is represented as the X-direction, the direction orthogonal to the incidence face 7L is represented as the Y-direction, the normal direction of the light deflection face 7a of the light guide body 7 i.e., the thickness direction of the light guide body 7 is represented as the Z-direction, when the light that is introduced into the inside of the light guide body 7 is observed from a Y-Z plane, the emission efficiency thereof and an emission angle are determined by a cross-sectional shape of the light deflection element 18 on the Y-Z plane.

On the other hand, when the light that is introduced into the inside of the light guide body 7 is observed from a X-Z plane, the optical path of light is deflected by the cross-sectional shape on the X-Z plane of the light deflection element 18, and furthermore, the light thereof is deflected by the optical path control element 19 formed on the emission face 7b.

Particularly, in order to allow the light that is incident to the light guide body 7 to be effectively emitted from the emission face 7b, it is necessary to consider not only the cross-sectional shape on the Y-Z plane of the light deflection element 18 but also a reciprocal action between the cross-sectional shape on the X-Z plane of the light deflection element 18 and the cross-sectional shape on the X-Z plane of the optical path control element 19.

Figure 15:
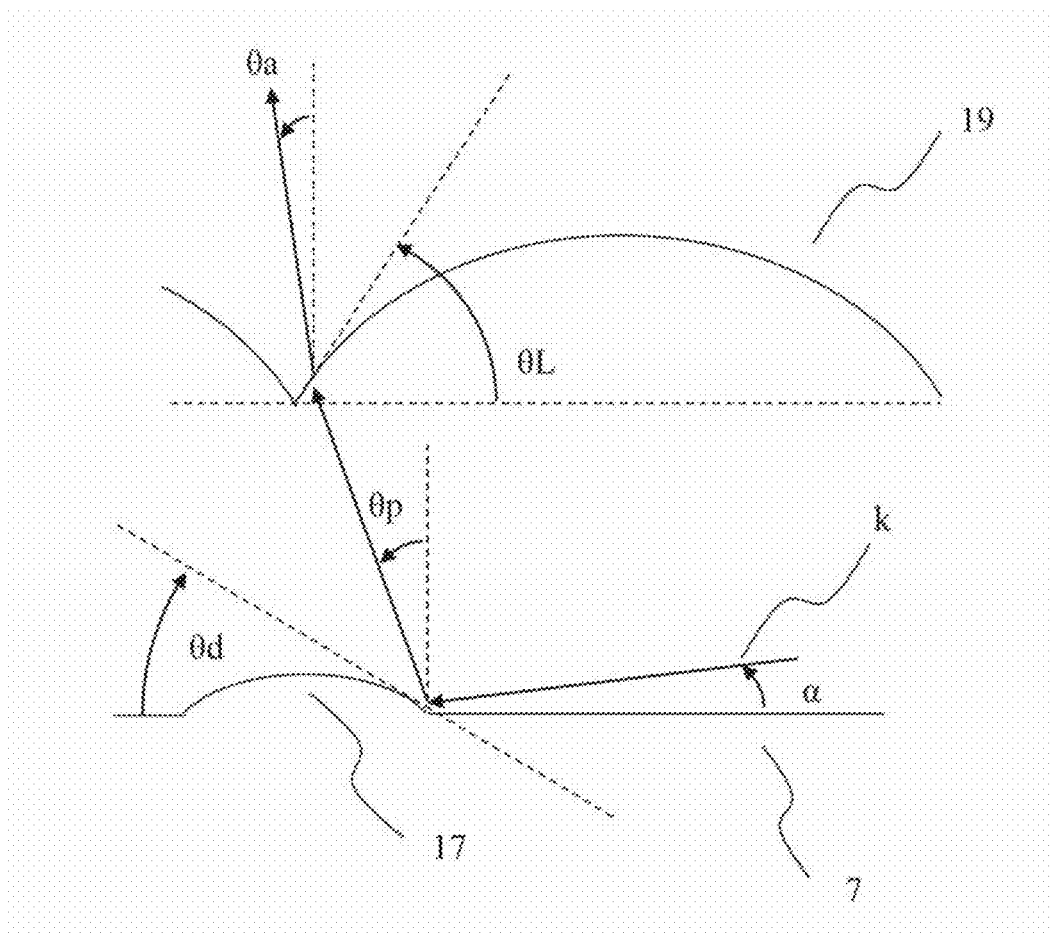
FIG. 15 is a diagram illustrating Equation 1.

FIG. 15 illustrates the relationship between the maximum tangent angle θd of the light deflection element 18 and the maximum tangent angle θL of the optical path control element 19 on the X-Z plane, and shows a state where the light beam k incident to the light deflection element 18 is reflected by the maximum tangent angle θd, the light beam k incident to the optical path control element 19 is refracted by the maximum tangent angle θL, and thereby emits therefrom.

Here, the case is considered where the light beam k enters the light deflection element 18 at an angle α with respect to the X-direction.

At this time, in order to reflect the light beam k, a total reflection condition which is due to a refractive index difference between the light deflection element 18 and air is represented by the following Formula (2). Behavior of the light beam k which satisfies the total reflection condition will be described.

(Equation 2)

$$\alpha \le \frac{\pi}{2} - \theta d - \operatorname{Sin}^{-1}\left(\frac{1}{n}\right) \qquad \text{Formula (2)}$$

The light beam k having the light path that is reflected by the light deflection element 18 and is changed to as to travel toward the emission face 7b is refracted by the optical-path deflection element 19 to transmit therethrough.

Here, in order to make the angle θa formed between the light beam k emitted from the light guide body 7 and the Z-axis smaller than the angle θp formed between the light k and the Z-axis in the light guide body 7, that is, in order to collect the light to be directed to the Z-direction by the optical path control element 19, the maximum tangent angle θL of the optical path control element 19 is required to satisfy the following Formula (3).

(Equation 3)

$$\theta L \ge \frac{\pi}{2} - 2\theta d - \alpha \qquad \text{Formula (3)}$$

Here, the case is considered where α is the largest angle, and the following Formula (4) is established.

(Equation 4)

$$\theta L \ge \operatorname{Sin}^{-1}\left(\frac{1}{n}\right) - \theta d \qquad \text{Formula (4)}$$

As a result of forming the optical path control element 19 satisfying Formula (4), the light beam k reflected by the light deflection element 18 is collected by the optical path control element 19 to be directed to the Z-direction and is emitted, and therefore, the luminance of the illumination device 3 improves.

Most preferably, an angle θa formed between the Z-axis and the light beam k that is refracted by the optical path control element 19 to be emitted therefrom is 0 degrees.

It is desirable that the condition at the time satisfy the following Formula (5).

(Equation 5)

$$\theta L = \operatorname{Tan}^{-1}\left(\frac{n*\sin\left(\operatorname{Sin}^{-1}\left(\frac{1}{n}\right) - \theta d\right)}{n*\cos\left(\operatorname{Sin}^{-1}\left(\frac{1}{n}\right) - \theta d\right) - 1}\right) \pm \alpha \qquad \text{Formula (5)}$$

A numerical formula that is obtained by excluding "±α" indicated by the right side of Formula (5) therefrom means that the angle θa between the Z-axis and the light beam k refracted by the optical path control element 19 to be emitted therefrom becomes 0 degrees.

Here, the incidence angle α of the light beam k is the maximum value.

However, since the incidence angle α of the light beam k that is reflected by the light deflection element 18 is in the range of 0 to the angle represented by Formula (2), it is preferable that the maximum tangent angle θL of the optical path control element 19 be set to the range of an optimal angle ±α.

In contrast, in the case where the maximum tangent angle θL of the optical path control element 19 is significantly large, since the light beam k entering the optical path control element 19 causes total reflection at the boundary face between the optical path control element 19 and air, it is undesirable.

Here, in consideration of the case where the incidence angle α of the light beam k is 0 degrees, it is desirable that the maximum tangent angle θL of the optical path control element 19 satisfy the following Formula (6).

(Equation 6)

$$\theta L \le \frac{\pi}{2} - 2\theta d + \operatorname{Sin}^{-1}\left(\frac{1}{n}\right) \qquad \text{Formula (6)}$$

If the maximum tangent angle θL of the optical path control element 19 does not satisfy Formula (5), since the incident light beam k at the maximum tangent angle θL of the optical path control element 19 cannot pass therethrough and is reflected thereby, it is undesirable.

It is more preferable that total reflection does not occur at the boundary face between the optical path control element 19 and air even in the case where the incidence angle α of the light beam k is the maximum angle that is determined Formula (2). It is more preferable to satisfy the following Formula (7).

(Equation 7)

$$\theta L \le 2\operatorname{Sin}^{-1}\left(\frac{1}{n}\right) - \theta d \qquad \text{Formula (7)}$$

Here, a method of calculating the maximum tangent angle θL of the optical path control element 19, and the maximum tangent angle θd of the light deflection element 18 will be described.

Figure 16:
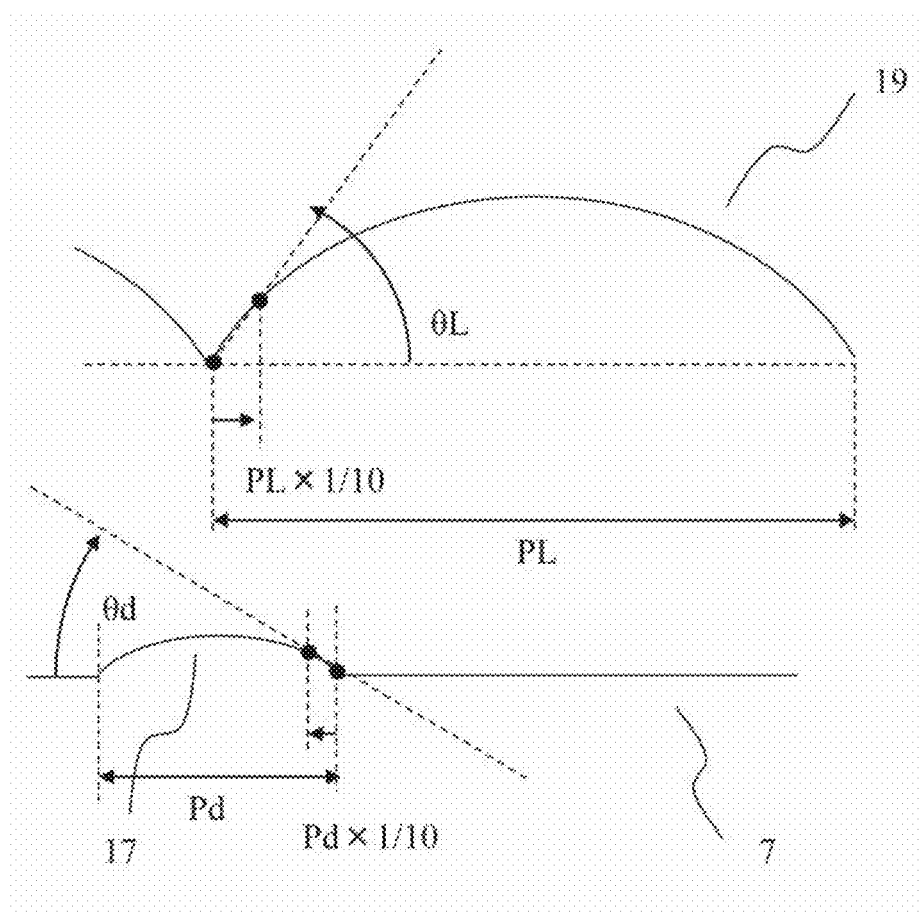
FIG. 16 is a diagram illustrating a method of calculating the maximum tangent angles θL and θd.

In the case where the optical path control element 19 is formed in a curved lenticular lens shape shown in FIG. 16, the maximum tangent angle is an angle at a bottom portion between adjacent optical path control elements 19, the angle of tangent becomes smaller in the direction from the bottom portion to the apex of the curved lenticular lens.

That is, since the angle of tangent continuously varies on the outline of the curved lenticular lens, it is difficult to discuss the maximum tangent angle from the viewpoint of one point of the bottom portion between the adjacent optical path control elements 19.

Because of this, definition of the maximum tangent angle θL is determined as stated below.

That is, where an interval of the curved lenticular lenses is represented as PL, a line is formed which connects the point between the bottom portions of the adjacent optical path control elements 19 and the point provided on the outline of the optical path control element 19 in cross-section at the position that is separated from this point by PL×1/10 in the X-direction, and an angle between the formed connection line and the X-direction is determined as the maximum tangent angle θL.

The maximum tangent angle θd of the light deflection element 18 is determined similar to the above.

Where a width of the light deflection element 18 in the X-direction is represented as Pd, a line is formed which connects the contact point between the light deflection face 7a and the light deflection element 18 (irregularity 17) and the point provided on the outline of the light deflection element 18 in cross-section at the position that is separated from the contact point by Pd×1/10 in the X-direction, and an angle between the formed connection line and the X-direction is determined as the maximum tangent angle θd.

As a material used to form the light guide body 7 related to the embodiment of the invention, an acrylic resin as typified by PMMA (polymethyl methacrylate) or a transparent resin such as PET (polyethylene terephthalate), PC (polycarbonate), COP (cycloolefin polymer), PAN (polyacrylonitrile copolymer), or AS (acrylonitrile-styrene copolymer), or the like is used.

As a method of forming the light guide body 7 related to the embodiment of the invention, an extrusion molding method, an injection molding method, or a heat press molding method is used, which is known in this technical field.

By use of such methods, the light guide body 7, the light deflection elements 18, and the optical path control elements 19 are integrally molded.

Additionally, after the light guide body 7 that is a flat plate is molded by use of the aforementioned producing method, the light deflection elements 18 and the optical path control elements 19 may be formed by a letterpress printing method using a UV-curable resin, a radiation curable resin, or the like.

It is preferable to integrally form the light deflection elements 18 and the optical path control elements 19 particularly using the extrusion molding method of the above-described methods producing the light guide body 7 of the embodiment of the invention.

Consequently, the number of steps for producing the light guide body 7 is reduced, molding is carried out using a roll-to-roll method, and therefore productivity increases.

Since the light deflection elements 18 that are formed on the light guide body 7 of the embodiment of the invention have a sparse-and-dense pattern that is directed to a linear direction, it is preferable that a width direction of a roll die coincide with a sparse-and-dense direction that is directed to a linear direction. By use of a roll die on which sparse-and-dense patterns are formed at a fixed distance in a rotation direction, it is possible to mold the light guide body 7 in a seamless manner.

Second Embodiment

Another embodiment of the invention will be described with reference to drawings.

Figure 17:
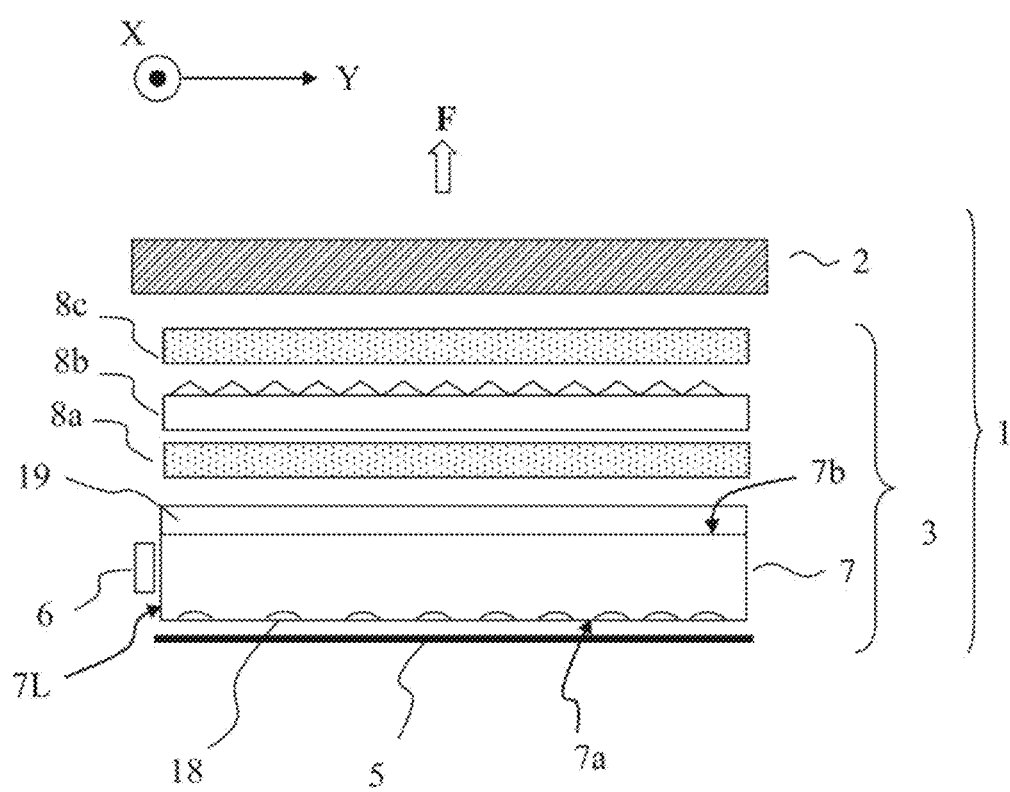
FIG. 17 is a schematic cross-sectional view of a display device of the embodiment of the invention.

FIG. 17 is a view showing an example in which the illumination device 3 of the embodiment of the invention is applied to a backlight unit of a display device 1.

In these drawings which are utilized in the following explanation, appropriate changes have been made to the scale of the various members, in order to represent them at scales at which they can be easily understood.

The display device 1 shown in FIG. 17 includes: an image display device 2 and the illumination device 3 that is disposed so as to face the light incidence side of the image display device 2.

The illumination device 3 is configured to include at least a diffusion optical sheet 8c that is disposed to face the light incidence side of the image display device 2, a light-condensing sheet 8b, a diffusion sheet 8a, the light guide body 7, the light sources 6, and the reflective plate 5.

As the diffusion sheet 8a, the diffusion sheet 8a obtained by coating a transparent base member with diffusion beads is adopted.

The diffusion sheet 8a shades the light deflection elements 18 formed on the light deflection face 7a of the light guide body 7 and thereby prevents the visibility thereof, the diffusion beads produce the same effect as that of micro lenses, and the diffusion sheet thereby has a function of collecting light emitted from the light guide body 7 to be directed to the viewer side F.

In addition, a micro lens sheet may be adopted on which micro lenses formed in a substantially hemispherical shape and having a high level of light-harvesting property are regularly or randomly placed.

The cross-sectional shape of the light-condensing sheet 8b is generally a triangle, and a prism lens sheet having apex angle of approximately 90 degrees is adopted.

The prism lens sheet 8b is one of optical sheets which has an extremely high level of light-harvesting property with respect to the viewer side F and is widely used.

Particularly, it is desirable that triangular prisms constituting the prism sheet 7b be arranged so that the extending direction thereof is orthogonal to the optical path control elements 19 that are formed on the emission face 7b of the light guide body 7; however, the direction can be suitably selected depending on a utilization form of the display device 1.

Generally, the display device 1 is required to have a wide and flat viewing field.

Since the prism sheet 7b collects light by making a viewing field narrow and thereby increases luminance at the viewer side F, it is preferable that triangular prisms extend in a screen horizontal direction and be arrayed in a screen vertical direction.

The diffusion optical sheet 8c is disposed to reduce the generation of moiré interference fringes, which are generated between the light-condensing sheet 8b and the image display device 2.

Additionally, in the case where the light-condensing sheet 8b is the prism lens sheet 8b, a function of reducing side lobe which is due to the prism lens sheet 8b is provided.

The diffusion optical sheet 8c may have a polarization-separation-reflection function.

The image display device 2 is preferably a device that allows light to pass through or shields light for each pixel and thereby displays an image.

If a device that allows light to pass through or shields light for each pixel and thereby displays an image is used as the image display device 2, the illumination device 3 of the embodiment of the invention effectively utilizes light having the improved luminance with respect to the viewer side F and can display an image with a high level of image quality.

It is preferable that the image display device 2 be a liquid crystal display device.

The liquid crystal display device is a typical device that allows light to pass through or shields light for each pixel and thereby displays an image, can increase an image quality as compared with the other display devices, and can reduce the manufacturing cost.

As described above, the display device 1 of the embodiment of the invention uses, as a backlight unit, the illumination device 3 including the light guide body 7 on which the optical path control elements 19 are formed.

Consequently, even where the density D of the light deflection elements is constant in the X-direction, since a dark region G which is a conventional problem does not occur, the display device 1 having a high level of uniformity in luminance can be obtained.

Furthermore, since the arrangement pattern of the light deflection elements 18 is divided into a plurality thereof in the Y-direction, the display device 1 that has a high degree of luminance and reduces visibility of the light deflection elements 18 can be obtained.

Also, since the inverse function 1/D(y) of the density D of the light deflection elements includes a periodic function that repeats an increase and a decrease in the density, the display device 1 having a high degree luminance at the screen center while maintaining screen uniformity in luminance can be obtained.

Moreover, since the maximum tangent angle θd in cross-section of the light deflection element 18 in the X-direction and the maximum tangent angle θL of the optical path control element 19 in cross-section in the X-direction satisfy the condition represented by Formula (1), the display device 1 having a high level of luminance caused by the synergistic effect which is due to two lenses can be obtained.

Third Embodiment

In the above-description, the optical path control elements 19 that are formed on the emission face 7b of the light guide body 7 constituting the display device 1 of the embodiment of the invention has a function of reducing visibility of the light deflection elements 18. Furthermore, another embodiment of the display device 1 that reduces visibility of the light deflection elements 18 will be described with reference to FIG. 18.

Figure 18:
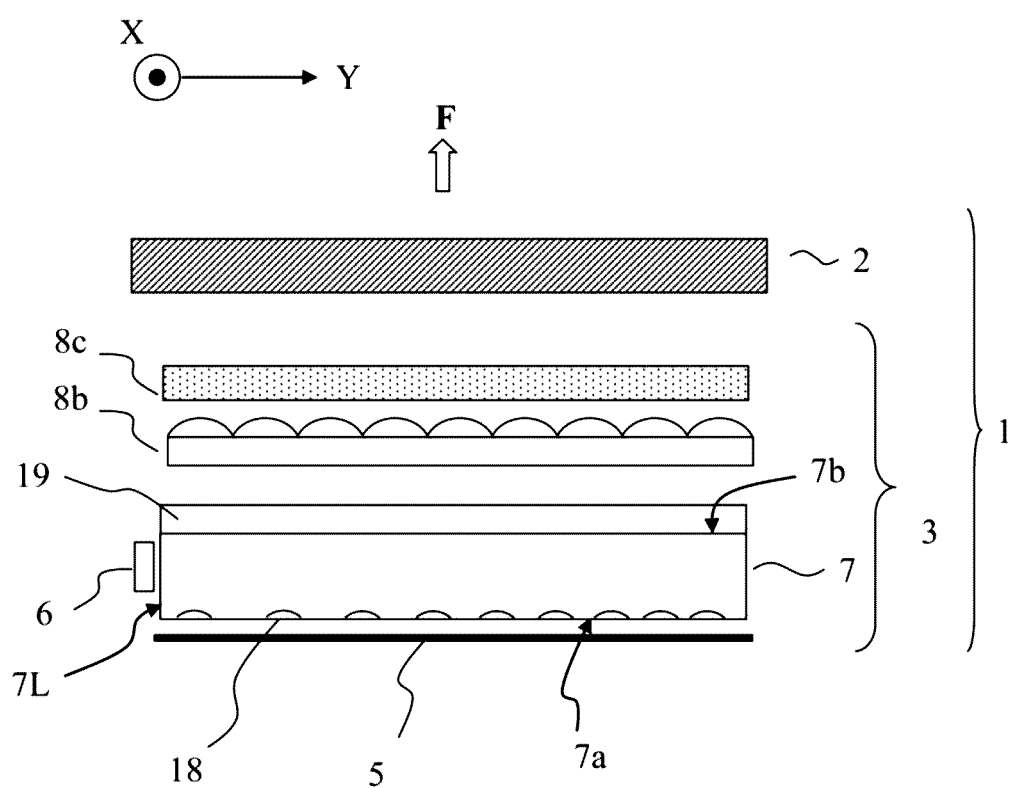
FIG. 18 is a schematic cross-sectional view of a display device of the embodiment of the invention.

The display device 1 shown in FIG. 18 is provided with the image display device 2 and the illumination device 3 that is disposed to face the light incidence side of the image display device 2.

The illumination device 3 is configured to include at least the light-condensing sheet 8b, the light guide body 7, the light sources 6, and the reflective plate 5, which are disposed to face the light incidence side of the image display device 2.

The diffusion optical sheet 8c is disposed as necessary and may be optionally removed.

Curved lenticular lenses having a spherical surface or a non-spherical surface are formed on a light transmissive base member of the light-condensing sheet 8b.

The curved lenticular lenses extend in the direction orthogonal to the optical path control elements 19 formed on the light guide body 7.

Moreover, the optical path control element 19 is a curved lenticular lens having a spherical surface or a non-spherical surface.

In the case where the optical path control elements 19 are formed in a curved lenticular lens shape, since an image that occurs due to the light diffused by the light deflection elements 18 is formed in a linear shape, the effect of reducing visibility of the light deflection elements 18 is obtained as described above.

The direction in which an image is linearly formed by the curved lenticular lenses coincides with the array direction of the curved lenticular lenses.

The display device 1 of the embodiment of the invention further includes a curved lenticular lens sheet 8b that is provided at the emission face side 7b of the light guide body 7 (at the position close to the emission face 7b).

Additionally, such curved lenticular lenses are arrayed so that the extending direction of the curved lenticular lenses which are formed on the curved lenticular lens sheet 8b is orthogonal to the extending direction of the curved lenticular lenses 19 formed on the emission face 7b of the light guide body 7.

For this reason, an image of the light deflection elements 18, which is linearly formed in the X-direction and is formed by the curved lenticular lenses formed on the emission face 7b of the light guide body 7, is further formed in the Y-direction by the curved lenticular lens sheet 8b, and a two-dimensional image is thereby formed (flat).

As mentioned above, since a dot-like image is converted into a sheet-like image, it is possible to considerably reduce visibility of the light deflection elements 18.

The curved lenticular lens sheet 8b is molded on a light transmissive base member by use of a UV resin or a radiation-curable resin.

As a material used to form the curved lenticular lens sheet 8b, PET (polyethylene terephthalate), PC (polycarbonate), PMMA (polymethyl methacrylate), COP (cycloolefin polymer), PAN (polyacrylonitrile copolymer), AS (acrylonitrile-styrene copolymer), or the like may be used.

The curved lenticular lens sheet 8b is produced by an extrusion molding method, an injection molding method, or a heat press molding method, which is known in this technical field.

Moreover, the curved lenticular lens 8b may include a dispersing agent in at least one of the base member thereof and the curved lenticular lens.

The display device 1 of the embodiment of the invention uses, as a backlight unit, the illumination device 3 that includes: the light guide body 7 on which the optical path control elements 19 are formed; and the light-condensing sheet 8b on which the curved lenticular lenses orthogonal to the curved lenticular lenses formed on the emission face 7b of the light guide body 7 are formed.

Consequently, even where the density D of the light deflection elements is constant in the X-direction, since a dark region G which is a conventional problem does not occur, a dot-like image which is due to the light deflection elements 18 is converted into a sheet-like image.

Accordingly, visibility of the light deflection elements 18 is considerably reduced, and the display device 1 having a high level of uniformity in luminance can be obtained.

In addition, since the arrangement pattern of the light deflection elements 18 is separated into a plurality thereof in the Y-direction, the display device 1 that has a high degree of luminance and reduces visibility of the light deflection elements 18 can be obtained.

Also, since the inverse function 1/D(y) of the density D of the light deflection elements includes a periodic function that repeats an increase and a decrease in the density, the display device 1 having a high degree luminance at the screen center while maintaining screen uniformity in luminance can be obtained.

Furthermore, since the maximum tangent angle θd in cross-section of the light deflection element 18 in the X-direction and the maximum tangent angle θL of the optical path control element 19 in cross-section in the X-direction satisfy the condition represented by Formula (1), the display device 1 having a high level of luminance caused by the synergistic effect which is due to two lenses can be obtained.

As described above, the illumination device 3 of the embodiment of the invention and the display device 1 are described; however, the illumination device 3 is not only applied to the display device 1.

In particular, it can be used in, for example, lighting equipment or the like serving as the illumination device 3 that has a function of efficiently converging light emitted from the light source 6.

EXAMPLES

Hereinbelow, the invention will be described in detail with reference to Examples. The invention is not only limited to the following Examples.

Example 1

(Substantial Configuration of Light Guide Body)

A light guide body 7 of the present Example will be described.

Curved lenticular lenses 19 having a height of approximately 50 μm and a width of approximately 150 μm are formed on a light emission face 7b of the light guide body 7.

The curved lenticular lenses 19 extend in the Y-direction and are arrayed in the X-direction without a space.

Here, the maximum tangent angle θL in cross-section in the X-direction is approximately 58 degrees.

Figure 20:
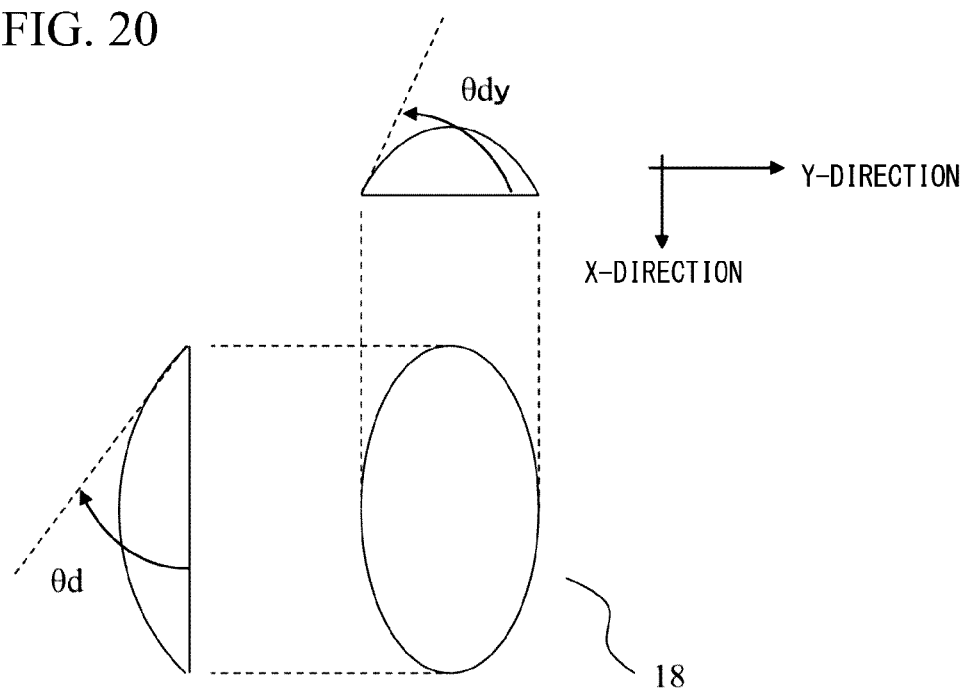
FIG. 20 is a diagram illustrating Example of the invention.

On the other hand, ellipsoidal micro dots 18 which have an elliptically-shaped bottom face and are formed in a concave shape are provided on the light deflection face 7a of the light guide body 7 as shown in FIG. 20.

The concave ellipsoidal micro dots 18 having the elliptically-shaped bottom face are discretely disposed on the light deflection face 7a so that the major axis of the ellipse coincides with the X-direction.

A length (size) of the major axis of the ellipsoidal micro dot 18 is approximately 200 μm, a length (size) of the minor axis thereof is approximately 100 μm, and a height of the lens thereof (depth in concave shape) is approximately 20 μm.

A thickness of the light guide body 7 is 3 mm, a size of the flat surface is 32 inch, and a long side of four side end faces forming the light guide body 7 is an incidence face 7L.

As a material used to form the light guide body 7, PMMA (polymethyl methacrylate) is used, and the light guide body 7 was manufactured by extrusion molding.

(Configuration of Light Deflection Elements)

The ellipsoidal micro dots 18 are arranged such that, as the positions of the ellipsoidal micro dots 18 become closer to the incidence face 7L, the density D thereof becomes lower, and the density D thereof becomes higher with an increase in a distance from the incidence face 7L to the position (sparse-and-dense configuration).

An arrangement pattern of the ellipsoidal micro dots 18 is separated into five regions in the Y-direction.

In each region, the arrangement pattern of the ellipsoidal micro dots 18 is designed so that Py/Px that is the ratio of the interval Py in the Y-direction to the interval Px in the X-direction of the ellipsoidal micro dots 18 is in the range of approximately 0.3 to 0.7.

That is, since the interval Px in the X-direction is fixed in each region, the interval Py in the Y-direction becomes lower with an increase in a distance from the incidence face 7L to the position at which the ellipsoidal micro dot 18 is arranged.

Because of this, the Py/Px becomes lower with an increase in a distance from the incidence face to the position at which the ellipsoidal micro dot 18 is arranged. Where the Py/Px becomes low to be approximately 0.3, it switches to the next region.

At this time, since the interval Px in the X-direction is smaller than the interval of the region close to the incidence face 7L, it is possible to increase the interval Py in the Y-direction.

As mentioned above, as a result of evaluating an optical simulation and a practical sample by the inventor, an optimal range of the Py/Px, which means the ratio of the interval Py in the Y-direction to the interval Px in the X-direction of the ellipsoidal micro dots 18, is in the range of 0.2 to 1.0.

As the Comparative Example, FIGS. 6A, 6B, 7A, and 7B illustrate how the light deflection elements 18 are to be viewed in the case where the Py/Px is out of range of the invention. The range Py/Px of the present Example representing 0.3 to 0.7 is a sufficient range to reduce visibility of the elliptical micro lenses 18.

Moreover, as a result of separating the region, the density D of the elliptical micro lenses at the position that is furthest from the incidence face 7L is approximately 90%.

Accordingly, the light that is introduced into the inside of the light guide body 7 can be efficiently emitted from the emission face 7b.

In the Comparative Example in which a region is not separated as shown in FIG. 8, since the density D of the light deflection elements at the position that is furthest from the light source 6 cannot increase, the efficiency of the illumination device 3 is degraded.

On the other hand, in the Comparative Example shown in FIG. 9, the light deflection elements 18 are visually recognized as being continuously arranged in a linear shape in the X-direction at the region located near the light source 6 (the region close to the light source 6).

Additionally, in a general printed light guide plate, the density of printed dots at the position that is furthest from the incidence face is up to approximately 70%.

For this reason, the light that is introduced into the inside of the printed light guide plate cannot be effectively emitted, and an amount of light leaking from the surface on a side opposite to the incidence face of the light guide body 7 becomes very large.

The inverse function 1/D(y) of the density function D(y) of the elliptical micro lenses 18 is represented by the sum of the first function F(y) that monotonically decreases with respect to the distance y from the incidence face, and the second function S(y) that repeatedly decreases and increases with respect to the distance y.

Firstly, regarding the first function F(y), an arrangement of the elliptical micro lenses 18 was designed so that variation in the differential value dF(y)/dy of the first function F(y) is less than or equal to twice the average value of the differential value dF(y)/dy within the range of 0<y/L<0.9 at any point where L is a distance from the incidence face 7L to the face on the opposite side of the incidence face 7L, that is, a length of the light guide body 7 in the Y-direction.

Particularly, as a result of designing the placement of the elliptical micro lenses 18 so that the differential value dF(y)/dy of the first function F(y) is greater than the average value in the vicinity of a light source (the position close to the light source), and is equal to the average value near the center of the screen, it is possible to obtain a luminance distribution having a curved shape in which the luminance of the center of the screen is highest as shown in FIG. 11.

Furthermore, the period of the second function S(y) is set to 1/2.5 with respect to the length L of the light guide body 7 in the Y-direction so that the peaks thereof are located to three positions of L/10, L×5/10, and L×9/10 as shown in FIG. 11.

Figure 19:
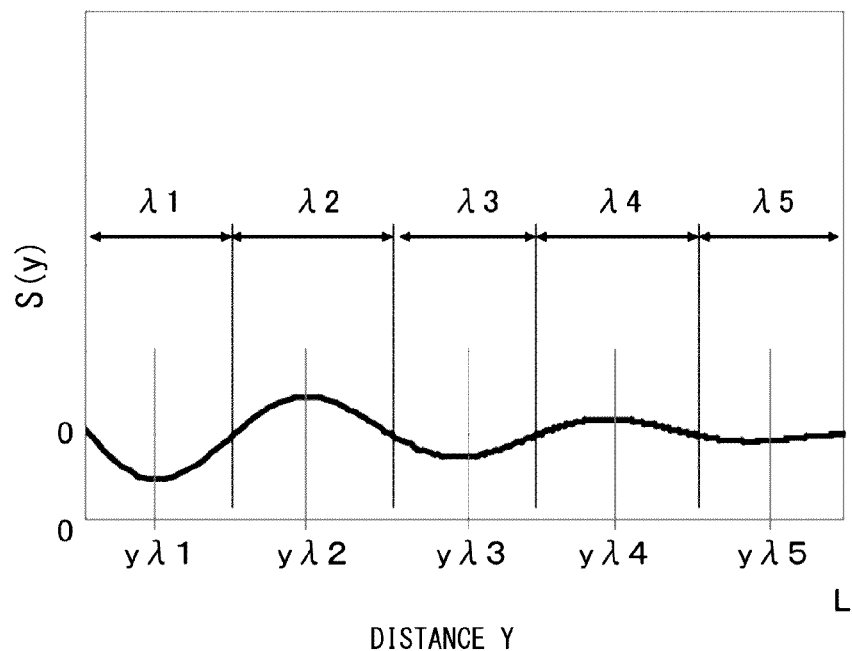
FIG. 19 is a schematic cross-sectional view of a display device of the embodiment of the invention.

The second function S(y) will be described with reference to FIG. 19.

In the light guide body 7 of the present Example, in order to obtain a luminance distribution having three peaks, it is preferable that a decrease-and-increase repetition period of the second function S(y) be set to 2.5 periods with respect to the length L of the light guide body 7.

However, where each length of five half-periods (0.5 period×5) which form 2.5 periods is represented as $\lambda 1$, $\lambda 2, \ldots \lambda 5$, the lengths of the half-periods may be different from each other.

It is desirable to design the arrangement of the elliptical micro lenses 18 so that the average period that is to be calculated by summing the half-periods be within the range of 0.7×L/2.5 to 1.2×L/2.5.

Next, the amplitude of vibration of the second function S(y) will be described.

The absolute value of the maximum amplitude of each half period of the second function S(y) becomes smaller in the direction from the light source 6 to the position apart from the light source 6.

The reason is that the first function F(y) monotonically decreases with respect to the distance y from the light source 6.

At this time, the positions of the maximum amplitudes of the half periods are represented as $y\lambda 1$, $y\lambda 2, \ldots, y\lambda 5$. As described above, it is desirable to determine the absolute value of the maximum amplitude of each half period of the second function S(y) so that the absolute value of the maximum amplitude of each half period becomes 0.01 to 0.1 times the value of the first function F(y) for each position thereof.

In the present Example, the placement of the elliptical micro lenses 18 was designed such that the absolute value of the maximum amplitude of each half period becomes 0.05 times the value of each position of the first function F(y).

(Configuration of Light Deflection Element)

Next, the ellipsoidal micro dot 18 constituting the light guide body 7 of the present Example will be described in detail.

FIG. 20 is a view showing the ellipsoidal micro dot 18 of the present Example.

The major axis of the ellipsoidal micro dot 18 substantially coincides with the X-direction and the minor axis thereof substantially coincides with the Y-direction.

Accordingly, a cross-sectional face in the Y-direction, that is, a cross-sectional shape of the ellipsoidal micro dot 18 in the minor axis is a face orthogonal to the optical axis of the light source 6, and this cross-sectional shape in the minor axis is of importance in order to allow light that is incident to the light guide body 7 to be effectively emitted from the emission face 7b.

In the present Example, a cross-sectional shape of the ellipsoidal micro dot 18 in the minor axis is a spherical shape. A cross-sectional shape of the light deflection elements 18 in the Y-direction may be a triangular prism shape.

The reason is that, since a face orthogonal to the optical axis of the light source 6 is a straight line, the emitted light is easily collected in a predetermined direction.

Moreover, the apex of the triangular prism shape may be rounded.

In contrast, in the case where a cross-sectional shape of the light deflection element 18 in the Y-direction is a curved line such as spherical surface or non-spherical surface, the light is emitted in a certain degree of wide-angle range.

Consequently, there is an advantage in that visibility of the light deflection elements 18 is easily reduced.

Moreover, the emission efficiency of the light that is introduced into the inside of the light guide body 7 can be obtained such as being the same efficiency as in the case where the shape of the light deflection element 18 is the aforementioned prism shape.

Furthermore, in the case where the illumination device 3 of the embodiment of the invention is used in a backlight unit of a liquid crystal television as an example, the light emitted from the light guide body 7 is diffused and collected by the transmissive optical sheet 8 disposed between the light guide body 7 and the display device 2.

Therefore, the emission in a wide-angle range does not cause a disadvantage.

A spherical shape or a prism shape can be suitably selected as the configuration of the light deflection element 18 forming the light guide body 7 related to the embodiment of the invention depending on a situation to which it is applied or on the purpose thereof.

As shown in FIG. 20, the light deflection element 18 of the present Example is the ellipsoidal micro dot 18.

As a result of the study by the inventor, where the maximum angle formed between the tangential line and the first main surface is represented as θdy in the cross-sectional shape in the Y-direction, if the angle is 15 to 70 degrees, the light that is introduced into the inside of the light guide body 7 can be effectively emitted from the emission face 7b, it is preferable.

Furthermore, in the case where the illumination device 3 is used in a backlight unit of a liquid crystal television, an optimal range of a maximum angle θdy is determined depending on a configuration of the transmissive optical sheet 8 disposed between the light guide body 7 and the display device 2.

As shown in FIG. 17, the case where the diffusion sheet 8a, the light-condensing sheet 8b, and the diffusion optical sheet 8c are disposed between the light guide body 7 and the display device 2 will be described.

A triangular prism sheet is used as the light-condensing sheet 8b in FIG. 17. A lenticular lens sheet may be used.

One of side end faces of the light guide body 7 is an incidence face 7L, the optical axis of the light source 6 is parallel to the Y-direction.

The peak angle of the light emitted from the light guide body 7 is inclined with respect to the front direction (viewer side F) and directed to the Y-direction (the right direction in FIG. 17).

Here, the lenses of the light-condensing sheet 8b are arrayed in the Y-direction and extend in the X-direction.

That is, since the lens face of the light-condensing sheet 8b is in a direction orthogonal to the direction of the light emitted from the light guide body 7, the light that is obliquely emitted from the light guide body 7 is deflected toward the viewer side F, and a front luminance increases.

Particularly, in the case where the light-condensing sheet 8b is a triangular prism sheet having an apex angle of 90 degrees, obliquely-incident light is refracted and collected in the front direction, and front incident light is reflected and returned.

Because of this, in the case where the light emitted from the light guide body 7 is inclined relative to the front direction, it is possible to efficiently collect light in the front direction.

For these reasons, in the case where the lenses of the light-condensing sheet 8b extend in the X-direction and are arrayed in the Y-direction, the maximum tangent angle θdy in cross-section of the light deflection element 18 in the X-direction is desirably a small angle in the above-mentioned range and is more desirably in the range of 15 to 50 degrees.

On the other hand, in the case where the direction of the lens of the light-condensing sheet 8b is different from that of FIG. 17 by 90 degrees, that is, in the case where the lenses extend in the Y-direction and are arranged in the X-direction, since the lens face of the light-condensing sheet 8b is parallel to the direction in which the light is emitted from the light guide body 7, the light that is emitted from the light guide body 7 by use of the above-mentioned light-condensing sheet 8b cannot be deflected by the lens face.

In this case, as the peak angle of the light that is emitted from the light guide body 7 becomes closer to the viewer side F, the illumination device 3 having a high level of luminance can be obtained.

For these reasons, in the case where the lenses of the light-condensing sheet 8b extend in the Y-direction and are arrayed in the X-direction, the maximum tangent angle θdy in cross-section of the light deflection element 18 in the X-direction is desirably a large angle in the above-mentioned range and is more desirably in the range of 35 to 70 degrees.

In the light guide body 7 of the present Example, one long side of four side end faces is an incidence face 7L.

That is, in a cross-sectional view showing the display device 1 shown in FIG. 17, the X-direction is a screen horizontal direction and the Y-direction is a screen vertical direction.

In the display device 1, it is preferable that the view angle of screen horizontal direction be wider than the view angle of the screen vertical direction.

That is, regarding an arrangement direction of the light-condensing sheet 8b, it is preferable that the lenses constituting the sheet extend in the screen horizontal direction and are arrayed in the screen vertical direction.

Accordingly, in the present Example, the lenses of the light-condensing sheet 8b are configured to extend in the X-direction and to be arrayed in the Y-direction.

Because of this, the maximum tangent angle θdy in cross-section of the light deflection element 18 in the X-direction is 30 degrees.

(Configuration of Light Deflection Element and Configuration of Optical Path Control Element)

Next, a configuration of the ellipsoidal micro dot 18 in cross-section in the X-direction and a configuration of a curved lenticular lens 19 serving as the optical path control elements 19 will be described.

As mentioned above, it is preferable that the maximum tangent angle θd of the ellipsoidal micro dot 18 in cross-section in the X-direction and the maximum tangent angle θL of the curved lenticular lens 19 in cross-section in the X-direction satisfy Formula (1).

Here, since the light guide body 7 of the present Example is made of PMMA, the refractive index thereof is approximately 1.49.

The configuration of the ellipsoidal micro dot 18 of the present Example in cross-section in the X-direction has a spherical surface having the maximum tangent angle θd of 25 degrees.

In the above-description, since the maximum tangent angle θL of the curved lenticular lens 19 of the present Example is approximately 58 degrees, it is desirable that the maximum tangent angle θd of the ellipsoidal micro dot 18 in cross-section in the X-direction be less than or equal to approximately 38 degrees.

(Optical Characterization of Light Guide Body)

The light guide body 7 was disposed in a liquid crystal television as described above so that the configuration and the arrangement of the light deflection elements 18 and the configuration of the optical path control elements 19 are determined, and the optical characterization thereof was carried out.

The liquid crystal television was constituted of the liquid crystal display device 2, an upper diffusion sheet 8c, the light-condensing sheet 8b, the diffusion sheet 8a, the light guide body 7, and the reflective sheet 5 in this order from the viewer side F.

One long side of the four side end faces forming the light guide body 7 was the incidence face 7L, and a plurality of light sources 6 are arranged at the incidence face 7L.

Moreover, as a Comparative Example 1, a commonly-used printed light guide plate was prepared.

An emission face of the printed light guide plate was flat, and dots made of white ink were printed on the light deflection face.

Figure 21:
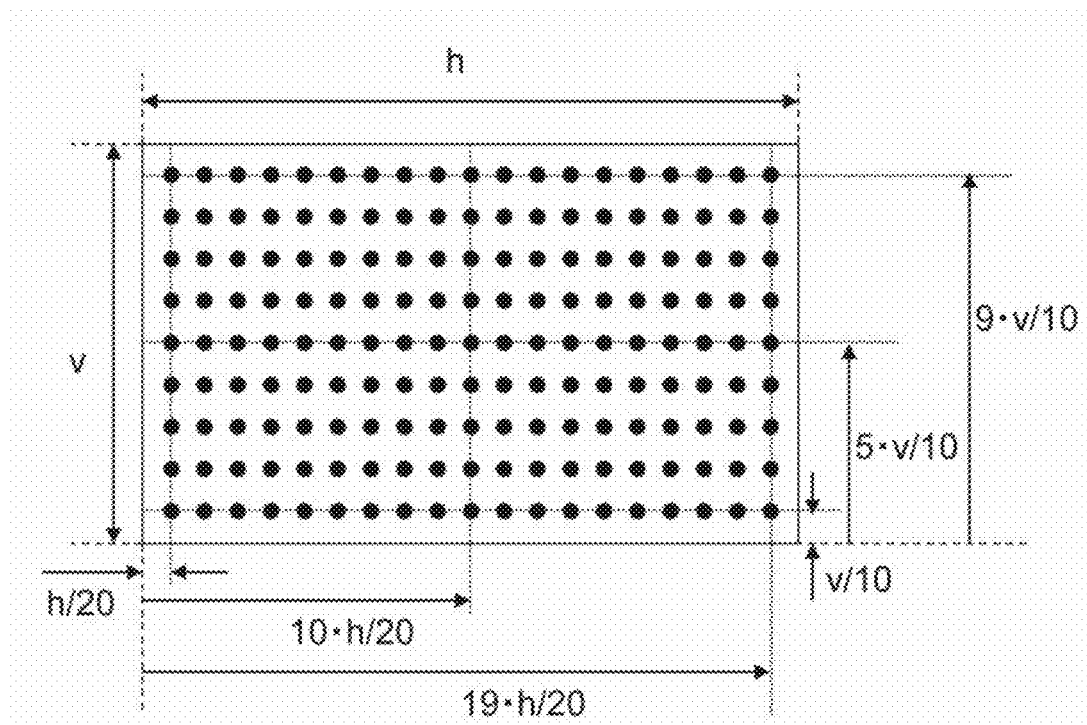
FIG. 21 is a diagram illustrating Example of the invention.

In the optical characterization, multi-point measurement was carried out on a screen as shown in FIG. 21 using a spectral radiance meter of SR-UL2 (made by TOPCON CORPORATION).

The number of measurement points was 19×9, totally 171 points, such that 9 points with an interval of 1/10 of the length v in the screen vertical direction and 19 points with an interval of 1/20 of the length h in the screen horizontal direction.

Luminance at the screen center (position of 5·v/10 and 10·h/20), the ratio Min/Max of an in-plane luminance minimal value to luminance maximum value, and luminance value of integral of 171 points were calculated, Example 1 was compared to the Comparative Example, evaluation was carried out, and the result of luminance measurement was thereby obtained.

The result is shown in FIG. 22.

In the liquid crystal television in which the light guide body 7 of the present Example is disposed, the luminance thereof at the screen center was improved by 15% higher than that in the case where the printed light guide plate of the Comparative Example 1 is disposed.

On the other hand, regarding Min/Max for the evaluation of variation in in-plane illumination, the present Example was 77% and the Comparative Example 1 was 78%, which were substantially equal to each other.

That is, it was possible to increase luminance at the center of the screen while the variations in in-plane illuminations are equal to each other.

Furthermore, regarding comparison of the luminance values of integral of 171 points, the efficiency of the present Example in which the light guide body 7 is disposed was improved by 10% higher than the printed light guide plate of the Comparative Example 1.

In short, it is true that the light utilization efficiency of the illumination device 3 in which the light guide body 7 of the present Example is disposed was improved by 10% higher than the printed light guide plate of the Comparative Example 1.

Furthermore, since the sparse-and-dense configuration of the ellipsoidal micro dots 18 that are formed on the light deflection face 7a of the light guide body 7 of the present Example is designed so as to increase luminance at the screen center without deteriorating in variation in luminance, the result that improvement in light utilization efficiency is 10%, luminance at the screen center increases by 15%, and variation thereof in luminance is equal to the Comparative Example 1 was obtained.

Example 2

(Substantial Configuration of Light Guide Body)

Next, the light guide body 7 of Example 2 will be described.

Curved lenticular lenses 19 having a height of approximately 50 μm and a width of approximately 150 μm are formed on a light emission face 7b of the light guide body 7 of the present Example.

The curved lenticular lenses 19 extend in the Y-direction and are arrayed in the X-direction without a space.

Here, the maximum tangent angle θL in cross-section in the X-direction is approximately 58 degrees.

On the other hand, ellipsoidal micro dots 18 which have an elliptically-shaped bottom face and are formed in a concave shape are provided on the light deflection face 7a of the light guide body 7 as shown in FIG. 20.

The concave ellipsoidal micro dots 18 having the elliptically-shaped bottom face are discretely disposed on the light deflection face 7a so that the major axis of the ellipse coincides with the X-direction.

A length (size) of the major axis of the ellipsoidal micro dot 18 is approximately 200 μm, a length (size) of the minor axis thereof is approximately 90 μm, and a height of the lens thereof (depth in concave shape) is approximately 20 μm.

A thickness of the light guide body 7 is 3 mm, a size of the flat surface is 40 inch, and two short sides which face each other of four side end faces forming the light guide body 7 are an incidence face 7L.

As a material used to form the light guide body 7, PMMA (polymethyl methacrylate) is used, and the light guide body 7 was manufactured by extrusion molding.

(Configuration of Light Deflection Elements)

The ellipsoidal micro dots 18 are arranged such that, as the positions of the ellipsoidal micro dots 18 become closer to the incidence face 7L, the density D thereof becomes lower, and the density D thereof becomes higher with an increase in a distance from the incidence face 7L to the position (sparse-and-dense configuration).

An arrangement pattern of the ellipsoidal micro dots 18 is separated into seven regions in the Y-direction.

However, two side end faces that are located opposite to each other of the four side end faces forming the light guide body 7 of the present Example are an incidence face 7L.

The light sources 6 are arranged at the two incidence faces 7L.

Therefore, the arrangement pattern of the ellipsoidal micro dots 18 is set so that the intervals Px of the light deflection elements 18 in the X-direction are substantially equal to each other and the intervals Py thereof in the Y-direction are substantially equal to each other in the first region and the seventh region, the second region and sixth region, and third region and fifth region of the seven regions.

In addition, the arrangement pattern of the ellipsoidal micro dots 18 is designed so as to be replicated at the center of the surface of the fourth region.

In each region, the arrangement pattern of the ellipsoidal micro dots 18 is designed so that Py/Px representing the ratio of the interval Py in the Y-direction to the interval Px in the X-direction of the ellipsoidal micro dots 18 is in the range of approximately 0.3 to 0.7.

As mentioned above, as a result of evaluating an optical simulation and a practical sample by the inventor, an optimal range of the Py/Px, which means the ratio of the interval Py in the Y-direction to the interval Px in the X-direction of the ellipsoidal micro dots 18, is in the range of 0.2 to 1.0; and the range Py/Px of the present Example representing 0.3 to 0.7 is a sufficient range to reduce visibility of the elliptical micro lenses 18.

The inverse function $1/D(y)$ of the density function $D(y)$ of the elliptical micro lenses 18 is represented by the sum of the first function $F(y)$ that monotonically decreases with respect to the distance y from the incidence face, and the second function $S(y)$ that repeatedly decreases and increases with respect to the distance y.

Since the light guide body 7 of the present Example has the two incidence faces that are located opposite to each other, Ymax is at the screen center position, that is, L/2.

Firstly, regarding the first function $F(y)$, an arrangement of the elliptical micro lenses 18 was designed so that variation in the differential value $dF(y)/dy$ of the first function $F(y)$ is less than or equal to twice the average value of the differential value $dF(y)/dy$ within the range of $0<y/L/2<0.9$ at any point where L is a distance from the incidence face 7L to the position furthest from the incidence face 7L, that is, the center position of the light guide body 7 in the Y-direction.

Furthermore, the period of the second function $S(y)$ is set to 1/2.5 with respect to the length L of the light guide body 7 in the Y-direction so that the peaks thereof are located to three positions of L/10, L×5/10, and L×9/10 as shown in FIG. 11.

Moreover, the absolute value of the maximum amplitude of each half period of the second function $S(y)$ becomes smaller with an increase in a distance from the light source 6.

Since the light guide body 7 of the present Example has the two incidence faces that are located opposite to each other, the position furthest from the light source is located at the center of the screen.

As described above, the second function $S(y)$ is represented by five half periods, and the placement of the elliptical micro lenses 18 was designed so that the absolute value of the maximum amplitude of each half period is 0.06 times the value of the first function $F(y)$ for each position.

(Configuration of Light Deflection Element)

Next, the ellipsoidal micro dot 18 constituting the light guide body 7 of the present Example will be described in detail.

Two short sides of the four side end faces forming the light guide body 7 of the present Example serve as the incidence face 7L.

That is, in a cross-sectional view showing the display device 1 shown in FIG. 17, the Y-direction is a screen horizontal direction and the X-direction is a screen vertical direction.

Accordingly, in the present Example, the lenses of the light-condensing sheet 8b are configured to extend in the Y-direction and to be arrayed in the X-direction.

Because of this, the maximum tangent angle θdy in cross-section of the light deflection element 18 in the X-direction is 60 degrees.

(Configuration of Light Deflection Element and Configuration of Optical Path Control Element)

Next, a configuration of the ellipsoidal micro dot 18 in cross-section in the X-direction and a configuration of a curved lenticular lens 19 serving as the optical path control elements 19 will be described.

As mentioned above, it is preferable that the maximum tangent angle θd of the ellipsoidal micro dot 18 in cross-section in the X-direction and the maximum tangent angle θL of the curved lenticular lens 19 in cross-section in the X-direction satisfy Formula (1).

The configuration of the ellipsoidal micro dot 18 of the present Example in cross-section in the X-direction has a spherical surface having the maximum tangent angle θd of 25 degrees.

In the above-description, since the maximum tangent angle θL of the curved lenticular lens 19 of the present Example is approximately 58 degrees, it is desirable that the maximum tangent angle θd of the ellipsoidal micro dot 18 in cross-section in the X-direction be less than or equal to approximately 38 degrees.

(Optical Characterization of Light Guide Body)

The light guide body 7 was disposed in a liquid crystal television as described above so that the configuration and the arrangement of the light deflection elements 18 and the configuration of the optical path control elements 19 are determined, and the optical characterization thereof was carried out.

The liquid crystal television was constituted of the liquid crystal display device 2, an upper diffusion sheet 8*c*, the light-condensing sheet 8*b*, the diffusion sheet 8*a*, the light guide body 7, and the reflective sheet 5 in this order from the viewer side F.

Two short sides of the four side end faces forming the light guide body 7 were the incidence face 7L, and a plurality of light sources 6 are arranged at two incidence faces 7L.

Particularly, in the Comparative Example 2, a commonly-used lenticular-lens-attached printed light guide plate was prepared.

The curved lenticular lenses are formed on an emission face of the printed light guide plate, and dots made of white ink were printed on the light deflection face.

In the optical characterization, multi-point measurement was carried out on a screen as shown in FIG. 21 using a spectral radiance meter of SR-UL2 (made by TOPCON CORPORATION).

The number of measurement points was 19×9, totally 171 points; that is, 9 points with an interval of 1/10 of the length v in the screen vertical direction and 19 points with an interval of 1/20 of the length h in the screen horizontal direction.

Luminance at the screen center (position of 5·v/10 and 10·h/20), the ratio Min/Max of an in-plane luminance minimal value to luminance maximum value, and luminance value of integral of 171 points were calculated, Example 2 was compared to the Comparative Example, evaluation was carried out, and the result of luminance measurement was thereby obtained. The result is shown in FIG. 23.

In the liquid crystal television in which the light guide body 7 of the present Example is disposed, the luminance thereof at the screen center was improved by 10% higher than that in the case where the lenticular-lens-attached printed light guide plate of the Comparative Example 2 is disposed.

On the other hand, regarding Min/Max for the evaluation of variation in in-plane illumination, the present Example was 81% and the Comparative Example 1 was 80%, which were substantially equal to each other.

That is, it was possible to increase luminance at the center of the screen while the variations in in-plane illuminations are equal to each other.

Furthermore, regarding comparison of the luminance values of integral of 171 points, the efficiency of the present Example in which the light guide body 7 is disposed was improved by 5% higher than the printed light guide plate of the Comparative Example 1.

In short, it is true that the light utilization efficiency of the illumination device 3 in which the light guide body 7 of the present Example is disposed was improved by 10% higher than the printed light guide plate of the Comparative Example 1.

Furthermore, since the sparse-and-dense configuration of the ellipsoidal micro dots 18 that are formed on the light deflection face 7*a* of the light guide body 7 of the present Example is designed so as to increase luminance at the screen center without deteriorating in variation in luminance, the result that improvement in light utilization efficiency is 5%, luminance at the screen center increases by 10%, and variation thereof in luminance is equal to the Comparative Example 1 was obtained.

In the above-description, the illumination device 3 of the embodiment of the invention, and the display device 1 are described in detail with reference to Examples, but the illumination device 3 and the display device 1 of the embodiment of the invention are not limited thereto.

In the present Example, the case where the light deflection elements 18 is formed in a concave shape is described in detail. Even in the case where the shape is convex, it is similar to the above.

Additionally, although the case where the illumination device 3 of the embodiment of the invention is used as a backlight unit of the display device 1 is described, it is not limited thereto.

For example, the illumination device 3 of the embodiment of the invention is applicable to lighting equipment.

INDUSTRIAL APPLICABILITY

The invention is widely applicable to an illumination device and a display device.

What is claimed is:

1. An illumination device comprising:
a transmissive light guide body having a first main surface, a second main surface that is located on the opposite side of the first main surface, and four side end faces that connect the first main surface to the second main surface, at least one of the four side end faces being an incidence face;
a plurality of light sources that are provided in a first direction, in which the incidence face extends, so as to face the incidence face;
a plurality of light deflection elements that are independently provided on the first main surface, deflects light, which is incident to the incidence face and is introduced into the inside of the light guide body, to be directed to the second main surface, the light deflection elements being in a concave or convex scattered arrangement; and
an optical path control element that is provided on the second main surface, extends in a second direction substantially orthogonal to the first direction, and regulates an optical path of the light that is introduced into the inside of the light guide body, wherein
a density D of the light deflection elements, which represents the number of the light deflection elements being present per unit area, that increases with an increase in a distance in the second direction from the incidence face to the position at which the light deflection elements are arranged,
an arrangement pattern of the light deflection elements is separated into a plurality of regions in the second direction, in one region, an arrangement interval of the light deflection elements in the first direction is substantially constant, an arrangement interval of the light deflection elements in the second direction varies to be small with increased distance from the incidence face, in between the regions, as the arrangement interval of the light deflection elements in the first direction discontinuously varies, the arrangement interval in the first direction becomes small with increased distance of the region from the incidence face, where the region which is close to the incidence face is referred to as a first region, the region which is away from the incidence face is referred to as a second region, as the arrangement interval of the light deflection elements in the second direction discontinuously varies at the boundary between the first region and the second region, the arrangement interval of part of the first region which is closest to the boundary is smaller than the arrangement interval of part of the second region which is closest to the boundary, regarding the density D of the light deflection elements which represents the number of the light deflection elements being present per unit area, a function of reciprocal number $1/D(y)$ of a density function $D(y)$ based on a distance y from the incidence face to a position at which the light deflection elements are provided is represented by mainly summing two functions of a first function $F(y)$ and a second function $S(y)$, the first function $F(y)$ monotonically decreases with respect to the distance y, and while the second function $S(y)$ repeatedly decreases and increases several times with respect to the distance y, an absolute value of a maximum amplitude value of each cycle thereof monotonically decreases.

2. The illumination device according to claim 1, wherein a maximum value of the distance y is represented as Ymax, and variation in differential value $dF(y)/dy$ of the first function $F(y)$ is less than or equal to twice the average value of the differential value $dF(y)/dy$ in a range of $0<y/Ymax<0.9$.

3. The illumination device according to claim 1, wherein a distance from the incidence face to a side end face that is located opposite to the incidence face is represented as L, and a decrease-and-increase repetition period of the second function $S(y)$ is in a range of $0.7×L/2.5$ to $1.2×L/2.5$.

4. The illumination device according to claim 1, wherein where a position at which the differential value $dS(y)/dy$ of the second function $S(y)$ becomes 0 is represented as $yλi$ (i=1, 2, ... n), $$0.01×F(yλi)<|S(yλi)|<0.1×F(yλi)$$

is satisfied.

5. The illumination device according to claim 1, wherein where: a maximum angle formed between the first main surface and a tangential line of a cross-sectional shape, which is obtained by cutting the light deflection element by a face that is perpendicular to the first main surface and parallel to the first direction, is represented as $θd$; a maximum angle formed between the first main surface and a tangential line of a cross-sectional shape by cutting the optical path control element by a face that is perpendicular to the first main surface and parallel to the first direction is represented as $θL$; and a refractive index of the light guide body is represented as n, the maximum angle $θL$ of the optical path control element satisfies the range defined by the following Formula (1)

(Equation 1)

$$\sin^{-1}\left(\frac{1}{n}\right) - θd ≤ θL ≤ \frac{π}{2} - 2θd + \sin^{-1}\left(\frac{1}{n}\right). \quad \text{Formula (1)}$$

6. The illumination device according to claim 1, further comprising
a reflective sheet that is provided at a position facing the first main surface of the light guide body.

7. The illumination device according to claim 1, further comprising
at least one or more transmissive optical sheets that are provided at a position facing the second main surface of the light guide body.

8. A display device comprising:
a plurality of pixels;
an image display device that determines a display image in accordance with light transmission or light shielding for each of the pixels; and
the illumination device according to claim 1.

* * * * *